(12) United States Patent
Wasson et al.

(10) Patent No.: US 10,493,569 B2
(45) Date of Patent: Dec. 3, 2019

(54) FIELD GIRTH WELDING TECHNOLOGY FOR HIGH MANGANESE STEEL SLURRY PIPELINES

(71) Applicants: EXXONMOBIL RESEARCH AND ENGINEERING COMPANY, Annandale, NJ (US); POSCO, Pohang-Si, Gyeongbuk-do (KR)

(72) Inventors: Andrew J. Wasson, Spring, TX (US); Timothy D. Anderson, Spring, TX (US); Douglas P. Fairchild, Sugar Land, TX (US); Xin Yue, Spring, TX (US); HyunWoo Jin, Easton, PA (US); Ning Ma, Whitehouse Station, NJ (US); IlWook Han, Pohang (KR); Sangchul Lee, Pohang (KR); Bongkeun Lee, Pohang (KR); Jongsub Lee, Seoul (KR)

(73) Assignees: ExxonMobil Research and Engineering Company, Annandale, NJ (US); POSCO (KR)

( * ) Notice: Subject to any disclaimer, the term of this patent is extended or adjusted under 35 U.S.C. 154(b) by 136 days.

(21) Appl. No.: 15/584,794

(22) Filed: May 2, 2017

(65) Prior Publication Data
US 2018/0021895 A1 Jan. 25, 2018

Related U.S. Application Data

(60) Provisional application No. 62/330,415, filed on May 2, 2016.

(51) Int. Cl.
*B23K 35/30* (2006.01)
*B23K 9/16* (2006.01)
(Continued)

(52) U.S. Cl.
CPC .......... *B23K 35/3073* (2013.01); *B23K 9/16* (2013.01); *B23K 35/0261* (2013.01);
(Continued)

(58) Field of Classification Search
CPC ............. B23K 35/3073; B23K 35/383; B23K 35/0261; B23K 9/025; B23K 9/09;
(Continued)

(56) References Cited

U.S. PATENT DOCUMENTS 3,716,691 A * 2/1973 Baybrook ............... C22C 38/58
219/137 R
4,017,711 A 4/1977 Honma et al.
(Continued)

FOREIGN PATENT DOCUMENTS

| EP | 2592167 | 5/2013 |
|---|---|---|
| KR | 10-2015-0105623 | 9/2015 |
| WO | WO 2015-083878 | 6/2015 |

OTHER PUBLICATIONS

US 2013/0174941 or U.S. Pat. No. 9,394,579, Jul. 2013, Jul. 19, 2016, Kyung-Keun Um.

*Primary Examiner* — Matthew W Jellett
(74) *Attorney, Agent, or Firm* — Vorys, Sater, Seymour and Pease LLP

(57) ABSTRACT

The present disclosure relates to a welding composition for joining high manganese steel base metals and methods of applying the same. The composition includes: carbon in a range of about 0.4 wt % to about 0.8 wt %; manganese in a range of about 18 wt % to about 24 wt %; chromium in an amount of ≤ about 6 wt %; molybdenum in an amount of ≤ about 4 wt %; nickel in an amount of ≤ about 5 wt %; silicon in an amount of about 0.4 wt % to about 1.0 wt %; sulfur in an amount of ≤ about 200 ppm; phosphorus in an amount of
(Continued)

≤ about 200 ppm; and a balance including iron. In an embodiment, the composition has an austenitic phase.

10 Claims, 10 Drawing Sheets

(51) Int. Cl.
*B23K 35/02* (2006.01)
*B23K 35/38* (2006.01)
*C22C 38/44* (2006.01)
*C22C 38/48* (2006.01)
*C22C 38/50* (2006.01)
*C22C 38/58* (2006.01)

(52) U.S. Cl.
CPC ............ *B23K 35/383* (2013.01); *C22C 38/44* (2013.01); *C22C 38/48* (2013.01); *C22C 38/50* (2013.01); *C22C 38/58* (2013.01)

(58) Field of Classification Search
CPC ...... B23K 9/173; B23K 9/23; B23K 2103/04; C22C 38/02; C22C 38/38; C22C 38/22; C22C 38/50; C22C 38/48; C22C 38/44; C22C 38/58; C21D 2211/001
See application file for complete search history.

(56) References Cited

U.S. PATENT DOCUMENTS

| | | | |
|---|---|---|---|
| 6,114,656 A * | 9/2000 | Fairchild | B23K 9/173 |
| | | | 219/137 WM |
| 6,565,678 B2 * | 5/2003 | Fairchild | B23K 35/3066 |
| | | | 148/320 |
| 2012/0160363 A1 | 6/2012 | Jin et al. | |
| 2015/0129559 A1* | 5/2015 | Fairchild | B23K 35/308 |
| | | | 219/73 |
| 2016/0271739 A1* | 9/2016 | Lee | B23K 35/30 |
| 2016/0273083 A1* | 9/2016 | Lee | B23K 35/30 |

* cited by examiner

FIELD GIRTH WELDING TECHNOLOGY FOR HIGH MANGANESE STEEL SLURRY PIPELINES

CROSS REFERENCE TO RELATED APPLICATIONS

This application claims the benefit of and priority to U.S. Provisional Application No. 62/330,415 filed May 2, 2016, the disclosure of which is herein incorporated by reference in its entirety.

FIELD

The present disclosure relates to the field of welding metals. More particularly, the description provides materials and methods for producing weld metal required to join and construct high manganese (Mn) steel.

BACKGROUND

Piping systems in mining operations (including the oil sands mining industry) are used to transport mixtures of solid rock and sand particles in a liquid or slurry to a processing plant and to recycle debris back to the mining area or to a storage area. Current slurry hydro-transport pipes are typically made from low carbon, pipeline grade steel (e.g., API specification 5 L X65 or X70 grade steels). These pipes are subjected to significant abrasive/erosive wear and corrosion that causes wall loss and leads to frequent repairs and replacements. As such, these piping systems are often the source of significant operational costs for mining projects. There are significant economic incentives to develop pipe materials with improved erosion/wear/corrosion resistance.

There also exists a need for enhanced wear resistant steel in the oil sands mining industry. Such oil sands deposits have been commercially recovered since the 1960's, and the recovery rate has grown in recent years. Bitumen ore has generally been extracted either by surface mining techniques for shallow deposits (e.g., less than 100 m depth), or by in-situ thermal extraction (e.g., involving the injection of steam, chemical solvents and/or mixtures thereof) for deep deposits located deeper underground (e.g., around 100 m or deeper). For the surface mining of shallow oil sands, many types of heavy equipment and pipelines are utilized. First, the oil sands are typically excavated using shovels which transfer the mined material to trucks/vehicles. The vehicles move the oil sand ores to ore preparation facilities, where the mined ore is typically crushed and mixed with hot water. The oil sands slurries are then typically pumped through hydro-transport pipelines to the primary separation cell (PSC), where the oil bitumen is generally separated from the sand and water. After the bitumen is separated, the remaining sand and water slurry is then transported through tailings pipelines to tailings ponds for sands to settle down. The hydro-transport of large amounts of slurry mixture causes significant metal loss in conventional metallic pipelines or the like, which results in short replacement cycles and considerable operational costs.

Thus, the oil sands mining and ore preparation processes involve several stress and/or impact abrasion challenges in multiple equipment/operational areas (e.g., shovel teeth, hoppers, crushers, conveyers, vibrating screens, slurry pumps, pipelines, etc.). For example, in the downstream slurry transportation and extraction processes, some of the challenges encountered in the equipment, pipelines (e.g., hydro-transport pipelines), pumps and/or the PSC include erosion, erosion/corrosion, corrosion, stress, wear and/or abrasion or the like of the equipment/materials. These equipment/material erosion/corrosion challenges or the like lead to significant repair, replacement and/or maintenance costs, as well as to production losses.

As noted, current piping structures for slurry hydro-transport are typically made from low carbon, pipeline grade steel (e.g., API specification 5 L X70 in $45^{th}$ edition). In general, fast moving solids in the slurry flow can cause considerable metal loss from the pipes (e.g., metal loss of the inner pipe wall). The aqueous and aerated slurry flow also typically cause accelerated pipe erosion by creating a corrosive environment. Moreover, particulate matter in the slurry (under the influence of gravity) causes damage along, inter alia, the bottom inside half of the pipes. For example, the hydro-transport and tailings pipelines that carry the sand and water slurry in oil sands mining operations undergo severe erosion-corrosion damage during service, while the bottom part (e.g., at the 6 o'clock position) of the pipeline typically experiences the most severe erosion wear.

In order to extend the service life of the pipelines some mine operators have utilized the practice of periodically rotating pipelines. For example, the pipelines are occasionally rotated (e.g., after about 3000 hours of service) by about 90°. After about three rotations (e.g., after about 12000 hours of service), the pipelines are typically fully replaced. Various materials, such as martensitic stainless steels, hard-facing materials (e.g., WC-based, chromium-carbide based), and polymer lining materials (e.g., polyurethane), have been evaluated and used by oil sands mining operators. However, such materials have found only niche applications, typically due to either relatively poor wear/erosion performance (e.g., polymer liner), high material/fabrication costs (e.g., WC-based hard metal, chromium-carbide based hard metal overlay material), or limited available thicknesses (e.g., bi-metallic multi-layer hardened steel materials). Pipe erosion and the like remains a serious problem, and alternative pipe structures and/or materials are sought to allow for a more efficient/economical operation/solution.

Improved steel compositions having enhanced erosion/wear/corrosion performance have been developed recently to reduce operational costs in mining operations. Specifically, improved high manganese (Mn) steel with enhanced wear/erosion/corrosion resistance has been developed for oil sands mining applications, including slurry pipes. In order to be successfully implemented, high Mn steel slurry pipe sections must be joined together in the field to create high Mn steel slurry pipelines. Slurry pipelines are constructed using several different types of joining methods, including: girth butt welds, flanges, and mechanical couplings. The girth butt welds used to join high Mn steel slurry pipes sections directly to one another need to provide the required strength, toughness and wear properties and also should be applied during field construction without undue concern regarding "weldability" or ease of application. A girth butt weldment joining high Mn steel slurry pipe sections will be exposed to the internal slurry service fluids and solids and therefore must meet or exceed the erosion/corrosion performance of the pipe base metal in order to achieve maximum benefit of applying high Mn steel for the slurry pipe application.

High Mn steel weld metals developed to date are not sufficient for joining erosion resistant high Mn steel slurry pipelines. Conventional high Mn steel consumables used to weld cast Hadfield steel (commonly used in railway components) do not provide sufficient weld metal strength to be used to join the recently developed erosion resistant high Mn steel slurry pipes. High Mn steel welding consumables used for hard facing applications cannot consistently provide the required weld metal toughness levels for, for example, slurry pipeline girth welds.

U.S. Patent Application Publication No. 2013/0174941 describes high Mn steel developed for cryogenic applications such as storage containers for liquefied natural gas (LNG). Weld metals have been developed for cryogenic high Mn steel, such as those described in J. K. Choi, et al, "High Manganese Austenitic Steel for Cryogenic Applications", Proceedings of the $22^{nd}$ International ISOPE Conference, Rhodes, Greece 2012. These cryogenic high Mn steel weld metals, while providing sufficient toughness at very low temperatures down to −200° C., do not provide adequate weld metal strength for the erosion resistant high Mn steel when used for, for example, slurry pipe applications.

Thus, a need exists for welding technology that can be used to construct, e.g., high Mn steel slurry pipelines for oil sands mining projects that simultaneously produces adequate strength, adequate toughness, and high erosion/corrosion resistance that can be applied during high Mn steel pipeline field construction without undue concern regarding weldability or ease of use.

SUMMARY

In certain aspects, the present description provides a weld metal and methods of use that achieves adequate strength, adequate toughness, and high erosion/corrosion resistance to join erosion resistant high Mn steel slurry pipe through girth butt welding (e.g., joining high Mn steel to high Mn steel). The present disclosure provides weld metal chemistries, welding processes, and control of welding practices that produce suitable weld microstructures and mechanical properties for the application. The weld metal of the present disclosure may be referred to as erosion resistant, high Mn steel or ER-HMS.

In certain embodiments, the weld metal comprises between about 0.4 and about 0.8 wt % carbon, between about 18.0 and about 24.0 wt % manganese, chromium in an amount less than or equal to about 6.0% chromium, molybdenum in an amount of less than or equal to about 4.0 wt %, nickel in an amount of less than or equal to about 5.0 wt %, between about 0.4 and about 1.0% silicon, sulfur in an amount of less than or equal to about 200 ppm, and phosphorus in an amount of less than or equal to about 200 ppm. In additional embodiments, other elements may be added to enhance weld metal properties (e.g., strength) including at least one of: titanium in an amount of less than or equal to about 2 wt %, niobium in an amount of less than or equal to about 5 wt %, tungsten in an amount of less than or equal to about 5 wt %, aluminum in an amount of less than or equal to 1 wt %, nitrogen in an amount of less than or equal to about 1.5 wt %, boron in an amount of less than or equal to about 0.1 wt % boron, or a combination thereof. The balance of the weld metal comprises iron, for example, about 75% wt.

In certain embodiments, the weld metal further comprises at least one of: manganese in an amount between about 18.0 and about 22 wt %; chromium in an amount of about 2.0 to about 4.0 wt %; molybdenum in an amount between about 1.25 to 2.75 wt %; nickel in an amount less than about 5 wt %; silicon in an amount of between 0.2 to about 0.5 wt %; sulfur in an amount of less than or equal to 150 ppm.

In another embodiment, the welding filler metal has an austenite phase. In a particular embodiment, the austenite phase can transform into hard α'-martensite and undergoes microtwinning upon straining.

In another aspect, the description provides a system for applying the weld metal using welding equipment and parameters that enable control of weld arc stability and weld pool flow characteristics such as viscosity and bead shape to provide acceptable weldability. In certain embodiments, the system for providing erosion/corrosion resistant high manganese welds comprises a consumable wire electrode and a gas metal arc welding power source that perform gas metal arc welding. In certain embodiments, the consumable wire electrode comprises carbon in a range of about 0.4 wt % to about 0.8 wt %, manganese in a range of about 18 wt % to about 24 wt %, chromium in a range of about 0 wt % to about 6 wt %, molybdenum in an amount of less than or equal to about 4 wt %, nickel in an amount of less than or equal to about 5 wt %, silicon in an amount of about 0.4 wt % to about 1.0 wt %, sulfur in an amount of less than or equal to about 200 ppm, phosphorus in an amount of less than or equal to about 200 ppm, and a balance comprising iron. The gas metal arc welding power source produces a welding heat input no more than about 2.5 kJ/mm.

In another embodiment, the welding heat input is in a range of about 0.6 to about 1.0 kJ/mm.

In certain embodiments, the system further comprises an apparatus for providing at least one shielding gas, wherein the at least one shielding gas includes $CO_2$ in a range of about 10% to about 30%. In a particular embodiment, the at least one shielding gas is 80% Argon and 20% $CO_2$.

In an additional aspect, the description provides a method for applying a weld metal as described herein. In certain embodiments, the method includes applying a weld metal as described herein with welding equipment and parameters that enable control of weld arc stability and weld pool flow characteristics such as viscosity and bead shape to provide acceptable weldability. The weld metal chemistry, weld joint geometry, and welding heat input are controlled to ensure reduced susceptibility to solidification cracking and prevent significant degradation of weld metal and heat affected zone (HAZ) toughness. In a preferred embodiment, the weld metal of the present disclosure has a microstructure comprising austenite grains with a small volume fraction of carbides.

In further aspects, the description provides methods of producing a weld deposit of erosion/corrosion resistant high Mn steel. The method comprises: providing at least two high Mn steel bases to be welded and a welding filler metal; and melting and cooling the welding filler material to create a weld deposit. In certain embodiments, the welding filler metal comprises carbon in a range of about 0.4 wt % to about 0.8 wt %, manganese in a range of about 18 wt % to about 24 wt %, chromium in an amount less than or equal to about 6 wt %, molybdenum in an amount not greater than about 4 wt %, nickel in an amount not greater than about 5 wt %, silicon in a range of from about 0.4 wt % to about 1.0 wt %, sulfur in an amount not greater than about 200 ppm, phosphorus in an amount not greater than about 200 ppm, and a balance comprising iron.

In certain embodiments, melting comprises applying a welding heat input no more than about 2.5 kJ/mm to the welding filler metal.

In a particular embodiment, the at least two high Mn steel bases comprise a portion to be welded, the portions having bevels of about 30 degrees to about 37.5 degrees.

In another embodiment, the weld deposition has a yield strength in the as-welded condition greater than a yield strength of the high manganese steel base or greater than a required minimum yield strength.

In certain embodiments, the weld deposit has a has at least one of a yield strength in the as-welded condition greater than about 70 ksi, an ultimate tensile strength in the as-welded condition greater than 82.7 ksi, a tensile elongation in the as-welded condition greater than about 16%, and a CVN in the as-welded condition greater than about 27 J at −29° C.

In additional embodiments, a heat affected zone of the bases has a CVN after welding greater than about 27 J at −29° C.

In any of the aspects or embodiments described herein, the base metal or base steel is an erosion/corrosion resistant high Mn steel.

In any of the aspects or embodiments described herein, the method further comprises limiting carbon content in the weld metal to an amount less than an amount of carbon in the base metal.

The preceding general areas of utility are given by way of example only and are not intended to be limiting on the scope of the present disclosure and appended claims. Additional objects and advantages associated with the compositions, methods, and processes of the present disclosure will be appreciated by one of ordinary skill in the art in light of the instant claims, description, and examples. For example, the various aspects and embodiments of the disclosure may be utilized in numerous combinations, all of which are expressly contemplated by the present description. These additional advantages objects and embodiments are expressly included within the scope of the present disclosure. The publications and other materials used herein to illuminate the background of the disclosure, and in particular cases, to provide additional details respecting the practice, are incorporated by reference.

BRIEF DESCRIPTION OF THE DRAWINGS

The accompanying drawings, which are incorporated into and form a part of the specification, illustrate several embodiments of the present disclosure and, together with the description, serve to explain the principles of the disclosure. The drawings are only for the purpose of illustrating an embodiment of the disclosure and are not to be construed as limiting the disclosure.

DETAILED DESCRIPTION

Figure 1:
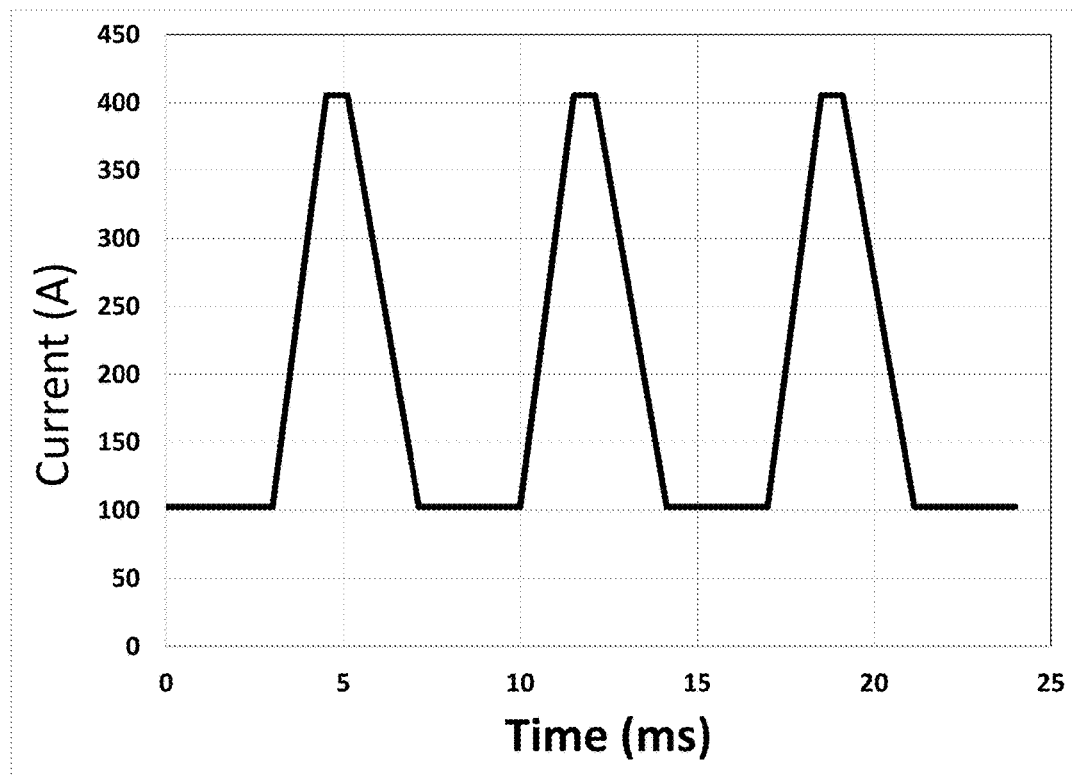
FIG. 1 shows an example of a pulsing current waveform developed with an advanced welding power supply for making erosion resistant high manganese steel (ER-HMS) girth welds.

In the following detailed description section, the specific embodiments of the present disclosure are described in connection with preferred embodiments. However, to the extent that the following description is specific to a particular embodiment or a particular use of the present disclosure, this is intended to be for exemplary purposes only and simply provides a description of the exemplary embodiments. The disclosure is not limited to the specific embodiments described below, but rather, it includes all alternatives, modifications, and equivalents falling within the spirit and scope of the appended claims.

Due to the concentration of carbon, nickel, and manganese in high Mn steel weld metals, as compared to typical carbon-manganese steel welds, high Mn steel weld metals are challenging to apply with traditional welding techniques. High Mn steel weld metals are substantially more viscous when molten, as compared to conventional low carbon steel weld metals. The increased viscosity of the molten high Mn steel weld metals can result in lack of fusion defects at weld toes located between the weld edges and the base metal. Moreover, the toughness of the high Mn steel base metal is sensitive to thermal cycles from welding. As a result, if the heat input during welding is too high, the high Mn steel base metal HAZ can have an unacceptable level of toughness. Furthermore, the weld metals solidify as primary austenite. The welds are, therefore, prone to solidification cracking if the weld metal composition, weld bevel geometry, and weld bead profile are not properly controlled.

Presently described are systems and methods that relate to the surprising and unexpected discovery that one can apply the high Mn steel weld metals of the present disclosure in the field with reduced defect potential, maintain practical weldability, and control weld bead profile. The system and methods described herein provide a high Mn steel weld with strength, toughness, and wear properties similar with those of the erosion/wear/corrosion resistant high Mn steel base metal.

In the following specification, the disclosure is described in the context of high manganese steel slurry pipelines used for oil sands production. However, embodiments of the disclosure are clearly of wider application to any welding of erosion/wear resistant high manganese steel components in which a weldment with adequate strength, toughness, and erosion/wear resistant is desirable, including but not limited to any non-pipe weldments. Various terms are defined in the following specification.

Where a range of values is provided, it is understood that each intervening value between the upper and lower limit of that range and any other stated or intervening value in that stated range is encompassed within the disclosure. The upper and lower limits of these smaller ranges may independently be included in the smaller ranges is also encompassed within the disclosure, subject to any specifically excluded limit in the stated range. Where the stated range includes one or both of the limits, ranges excluding either both of those included limits are also included in the disclosure.

The following terms are used to describe the present disclosure. In instances where a term is not specifically defined herein, that term is given an art-recognized meaning by those of ordinary skill applying that term in context to its use in describing the present disclosure.

All numerical values within the detailed description and the claims herein are modified by "about" or "approximately" the indicated value, and take into account experimental error and variations that would be expected by a person having ordinary skill in the art.

The articles "a" and "an" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

As used herein in the specification and in the claims, the phrase "at least one," in reference to a list of one or more elements, should be understood to mean at least one element selected from anyone or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Unless otherwise defined, all technical and scientific terms used herein have the same meaning as commonly understood by one of ordinary skill in the art to which this present disclosure belongs. The terminology used in the description of the present disclosure herein is for describing particular embodiments only and is not intended to be limiting of the present disclosure.

Definitions

Ductility: can mean, but is in no way limited to, a measure of a material's ability to undergo appreciable plastic deformation before fracture; it may be expressed as percent elongation (% EL) or percent area reduction (% AR).

Corrosion Resistance: can mean, but is in no way limited to, a material's inherent resistance to deterioration caused by exposure to a reactive or corrosive environment.

Toughness: can mean, but is in no way limited to, resistance to crack initiation and propagation.

Yield Strength: can mean, but is in no way limited to, the ability of a material to bear load without deformation.

Tensile Strength: can mean, but is in no way limited to, that strength corresponding to the maximum load carrying capability of the material in units of stress when the failure mechanism is not linear elastic fracture.

Cooling rate: can mean, but is in no way limited to, the rate of cooling of a piece of material, which in general is measured at the center, or substantially at the center, of a piece of material.

Heat-affected-zone (HAZ): can mean, but is in no way limited to, the base metal that is adjacent to the weld fusion line, which is not melted during the welding operation but is affected by the heat of welding.

Weldment: can mean, but is in no way limited to, an assembly of component parts joined by welding.

Weld bead penetration profile: can mean, but is in no way limited to, the shape of the weld bead near the bottom (root) of the weld bead when observed in a transverse cross-section.

Weldability: can mean, but is in no way limited to, the feasibility of welding a particular metal or alloy. Sometimes weldability refers to the susceptibility or hydrogen induced cracking during welding, but in the context of this disclosure, weldability refers to the ease of welding without creating defects such as lack of fusion, lack of penetration, or undercut. A number of factors contribute to poor weldability including a high surface tension molten weld pool and an erratic or unstable welding arc. These factors create symptoms observed by the welder including poor wetting of the weld pool in the adjacent base metal, sharp (or small) reentrant angles at the weld toes and undesirable weld spatter. Obtaining good weldability refers to a group of attributes including good weld pool fluidity, arc stability ("smooth" arc), good wetting of the weld pool at the junction with the base metal, good bead penetration geometry (all aimed at reducing weld defects).

Gas metal arc welding (GMAW): a welding process that utilizes a torch whereby the filler wire acts as the electrode, is automatically fed through a contact tip, and is consumed in the welding process. The contact tip is typically surrounded by a gas cup that directs shielding gas to the area of the welding arc. Common shielding gases are argon, $CO_2$, helium, and oxygen. Torch travel can be provided by a machine (automatic or mechanized) or can be provided by a human (semiautomatic). The process name GMAW is a standards designation of the American Welding Society.

Pulsed gas metal arc welding (PGMAW): A variation of the GMAW process that utilizes power sources that provide current pulsing capabilities. These are sometimes referred to as advanced current waveform power sources. The American Welding Society has termed PGMAW as GMAW-P.

GMAW-based processes: A number of allied processes similar to GMAW such as PGMAW, metal core arc welding (MCAW), and flux core arc welding (FCAW). The primary difference with MCAW is that a cored wire is used and there exists metal powders within the core. The FCAW process also uses a cored wire and the core typically consists of flux powders. FCAW may be used with or without shielding gas.

Austenite: can mean, but is in no way limited to, a metallurgical phase in steels that has a face-centered cubic (FCC) atomic crystalline structure.

Martensite: can mean, but is in no way limited to, a metallurgical phase in steels that can be, but not limited to, formed by diffusionless phase transformation in which the parent (typically austenite) and product phases have a specific orientation relationship.

ε(epsilon)-martensite: can mean, but is in no way limited to, a specific form of martensite having hexagonal close packed atomic crystalline structure which forms upon cooling or straining of austenite phase. ε-martensite typically forms on close packed (111) planes of austenite phase and is similar to deformation twins or stacking fault clusters in morphology.

α'(alpha prime)-martensite: can mean, but is in no way limited to, a specific form of martensite having body-centered cubic (BCC) or body-centered tetragonal (BCT) atomic crystalline structure which forms upon cooling or straining of austenite phase; α'-martensite typically forms as platelets.

Carbide: can mean, but is in no way limited to, a compound of iron/metal and carbon.

Weld Metal Composition:

In one aspect, the description provides an austenitic weld metal that is applied using a modern gas metal arc welding (GMAW) process with power source current waveform control sufficient to adequately produce a smooth, controlled welding arc and weld pool. This produces an austenitic microstructure useful for high Mn steel pipeline girth welds that are capable of simultaneously achieving suitable strength, suitable low temperature toughness in both the weld metal and HMS base metal heat affected zone, high erosion/corrosion resistance and welds with low defect rates. Embodiments of the present disclosure obtain good weldability, which refers to a group of attributes including good weld pool fluidity, arc stability ("smooth" arc), good wetting of the weld pool at the junction with the base metal, and good bead penetration geometry, all of which are aimed at reducing weld defects.

The ER-HMS weld metal chemistry can, in combination with the base metal HMS chemistry, be used to calculate the necessary consumable weld wire composition. In a similar fashion, the consumable weld wire chemistry and the base metal HMS chemistry can be used to calculate the ER-HMS weld metal chemistry. The ER-HMS chemistry can be applied to a variety of HMS base metals simply by alteration of the weld wire chemistry and knowledge of the welding process that controls the amount of penetration and base metal dilution. As is known to those skilled in the art of welding engineering, dilution calculations can be used to determine one of three chemistries when two of the chemistries are known or specified. In the case of welding HMS components (e.g., slurry pipe), there are three metals involved; the base metal, the weld metal, and the filler wire. For the application of mechanized MCAW pipeline girth welding described here, dilution is typically 5% to 20% for the majority of the weld passes. Dilution calculations are known in the art and are explained in a number of welding engineering textbooks including Welding Metallurgy, Volume 2, Third Edition, by George E. Linnert that was published by The American Welding Society.

The weld metal of the present disclosure produces adequate mechanical properties and good erosion/corrosion resistance for girth welds in high Mn steel slurry pipelines. These novel welds are suitable for slurry pipelines, and these welds can be applied during field construction with acceptable weldability and defect rates. The weld metal desired for a particular application is designed through choice of the weld metal chemistry and the welding method (process and procedure, including power source type and shielding gas selection) and can be applied in conditions of rugged field pipeline construction to produce suitable weld microstructure and mechanical properties.

In an embodiment, the weld metal comprises: between about 0.4 wt % and about 0.8 wt % carbon, between about 18 wt % and about 24 wt % manganese, chromium in an amount less than or equal to about 6 wt % chromium, molybdenum in an amount of less than or equal to about 4 wt %, nickel in an amount of less than or equal to about 5 wt %, between about 0.4 wt % to about 1.0 wt % silicon, sulfur in an amount of less than or equal to 200 ppm, phosphorus in an amount of less than or equal to about 200 ppm, and the balance is iron. All percentages herein relating to composition of the weld metal are expressed in wt %

(weight percent), unless otherwise specifically stated. While the balance of the weld metal composition is iron, it is possible the weld metal may include other unlisted components, for example impurities or the like.

Other elements may be added for the reasons outlined below. In an embodiment, the weld metal further comprises at least one of: titanium in an amount of less than or equal to about 2 wt %, niobium in an amount of less than or equal to about 5 wt %, tungsten in an amount of less than or equal to about 5 wt %, aluminum in an amount less than 1.0 wt %, boron in an amount of less than or equal to about 0.1 wt %, nitrogen in an amount of less than or equal to about 1.5 wt % or a combination thereof.

Weld Metallurgy, Microstructure, and Mechanical Properties:

In certain embodiments, the high Mn steel weld metals described in the present disclosure have similar mechanical properties and erosion/corrosion properties to the base metal high Mn steel used for, e.g., the slurry pipe application. As such, ER-HMS weld metal can have similar microstructure and similar strain-induced transformation behavior as the base metal high Mn steel for, e.g., slurry pipe application. Unlike conventional carbon steels, the microstructure of the high Mn steel can have a metastable austenite phase with a face centered cubic (fcc) structure at room temperature.

Upon straining, the metastable austenite phase can undergo a number of different phase transformations through strain-induced transformation. These transformations include: austenite phase transforms into microtwins (fcc) structure in which twin is aligned with matrix, $\varepsilon$-martensite (hexagonal lattice), and $\alpha'$-martensite (body centered tetragonal lattice), depending on specific steel chemistry and/or temperature.

These transformation products are key in producing the unique properties of high Mn steels. For example, fine microtwins effectively segment primary austenite grains and act as strong obstacles for dislocation motion. This effectively refines the grains and results in an excellent combination of high ultimate tensile strength and ductility.

The chemistry of base metal erosion resistant high Mn steel has been specifically tailored to produce transformation products that provide good erosion and wear performance. The base metal is produced to contain a metastable austenite phase, which often transforms into hard $\alpha'$-martensite upon straining. This friction-induced phase transformation leads to formation of a thin, hard surface layer consisting of a thin, hard surface layer consisting of martensite over an interior of tough, untransformed metastable austenite, which is a desirable combination for wear/erosion applications.

In another embodiment, surface grain refinement takes place in a surface layer of certain high Mn steels either prior to and/or during service/use (e.g., formed in-situ). For example, the grain refinement at the surface can result in the formation of a layer which possesses the unique combinations of high strength and hardness, high ductility, and/or high toughness. Such fine grained (e.g., about 100 nm layer in height) or ultrafine grained (e.g., about 10 nm layer in height) surface layer may be formed either prior to and/or during service/use (e.g., formed in-situ), and can impart step-out wear resistance, erosion resistance, and/or corrosion resistance to the steel.

In exemplary embodiments, the fine grained (e.g., about 100 nm layer) or ultrafine grained (e.g., about 10 nm layer) surface layer may be formed prior to use/installation of the exemplary steel by such surface deformation such as, without limitation, shot peening, laser shock peening, and/or surface burnishing.

In order to produce the required mechanical behavior in ER-HMS weld metal, the microstructure should be similar to that of the base metal erosion resistant HMS. Manganese is the primary element in high Mn steels, and it is important in stabilizing the austenitic structure during cooling and deformation. In some embodiments, the Mn levels are similar in both the weld metal and the base metal. In particular embodiments, the weld metal comprises manganese in an amount of about 18 wt % to about 24 wt %, about 18 wt % to about 23 wt %, about 18 wt % to about 22 wt %, about 18 wt % to about 21 wt %, about 18 wt % to about 20 wt %, about 18 wt % to about 19 wt %, 19 wt % to about 24 wt %, about 19 wt % to about 23 wt %, about 19 wt % to about 22 wt %, about 19 wt % to about 21 wt %, about 19 wt % to about 20 wt %, 20 wt % to about 24 wt %, about 20 wt % to about 23 wt %, about 20 wt % to about 22 wt %, about 20 wt % to about 21 wt %, 21 wt % to about 24 wt %, about 21 wt % to about 23 wt %, about 21 wt % to about 22 wt %, 22 wt % to about 24 wt %, about 2 wt % to about 23 wt %, or about 23 wt % to about 24 wt %. In other embodiments, the weld metal comprises about 18 wt %, about 18.5 wt %, about 19 wt %, about 19.5 wt %, about 20 wt %, about 20.5 wt %, about 21 wt %, about 21.5 wt %, about 22 wt %, about 22.5 wt %, about 23 wt %, about 23.5 wt %, or about 24 wt %.

In certain embodiments, the carbon content in the weld metal is at lower levels, as compared to the base metal. The lower carbon content helps to produce sufficient weldability (weld pool fluidity, arc stability, and weld bead profile) for pipeline welds. In a particular embodiment, the carbon in the base metal is greater than 1.0 wt % and the carbon in the weld metal is at levels less than 0.8 wt %. In some embodiments, the weld metal comprises carbon in an amount less than or equal to about 0.7 wt %, less than or equal to about 0.6 wt %, less than or equal to about 0.5 wt %, less than or equal to about 0.4 wt %, less than or equal to about 0.3 wt %, less than or equal to about 0.2 wt %, less than or equal to about 0.1 wt %, about 0.1 wt % to about 0.8 wt %, about 0.1 wt % to about 0.7 wt %, about 0.1 wt % to about 0.6 wt %, about 0.1 wt % to about 0.5 wt %, about 0.1 wt % to about 0.4 wt %, about 0.1 wt % to about 0.3 wt %, about 0.1 wt % to about 0.2 wt %, about 0.2 wt % to about 0.8 wt %, about 0.2 wt % to about 0.7 wt %, about 0.2 wt % to about 0.6 wt %, about 0.2 wt % to about 0.5 wt %, about 0.2 wt % to about 0.4 wt %, about 0.2 wt % to about 0.3 wt %, about 0.3 wt % to about 0.8 wt %, about 0.3 wt % to about 0.7 wt %, about 0.3 wt % to about 0.6 wt %, about 0.3 wt % to about 0.5 wt %, about 0.3 wt % to about 0.4 wt %, about 0.4 wt % to about 0.8 wt %, about 0.4 wt % to about 0.7 wt %, about 0.4 wt % to about 0.6 wt %, about 0.4 wt % to about 0.5 wt %, about 0.5 wt % to about 0.8 wt %, about 0.5 wt % to about 0.7 wt %, about 0.5 wt % to about 0.6 wt %, about 0.6 wt % to about 0.8 wt %, about 0.6 wt % to about 0.7 wt %, or about 0.7 wt % to about 0.8 wt %. In other embodiments, the weld metal comprises carbon in an amount of about 0.1 wt %, about 0.2 wt %, about 0.3 wt %, about 0.4 wt %, about 0.5 wt %, about 0.6 wt %, about 0.7 wt %, or about 0.8 wt %.

In austenitic HMS, carbon serves as an effective austenite stabilizer and also strengthens the matrix by solid solution hardening. The reduced carbon levels in the ER-HMS weld metal necessitate alloying the weld metal with additional elements to produce strength properties similar to the base metal.

Silicon additions provide some solid solution strengthening in addition to sustaining the $\alpha'$-martensite transformation. Silicon also serves to improve the weld pool fluidity during welding, which improves weldability. In an embodiment, the silicon content in the weld metal is increased beyond base metal levels due to the weldability benefits, e.g., in a range of from about 0.4 wt % to about 1.0 wt %. In some embodiments, the weld metal comprises silicon in an amount of about 0.4 wt % to about 0.9 wt %, about 0.4 wt % to about 0.8 wt %, about 0.4 wt % to about 0.7 wt %, about 0.4 wt % to about 0.6 wt %, about 0.4 wt % to about 0.5 wt %, about 0.5 wt % to about 1.0 wt %, about 0.5 wt % to about 0.9 wt %, about 0.5 wt % to about 0.8 wt %, about 0.5 wt % to about 0.7 wt %, about 0.5 wt % to about 0.6 wt %, about 0.6 wt % to about 1.0 wt %, about 0.6 wt % to about 0.9 wt %, about 0.6 wt % to about 0.8 wt %, about 0.4 wt % to about 0.7 wt %, about 0.7 wt % to about 1.0 wt %, about 0.7 wt % to about 0.9 wt %, about 0.7 wt % to about 0.8 wt %, about 0.8 wt % to about 1.0 wt %, about 0.8 wt % to about 0.9 wt %, or about 0.9 wt % to about 1.0 wt %.

Chromium additions increase corrosion resistance and are important to ensure the weld metal corrosion resistance is similar to the base metal corrosion resistance. Chromium additions at higher levels also enhance formation of ferrite phase during cooling and lead to formation of carbides during cooling and re-heating. In some embodiments, the chromium content is present in an amount less than or equal to about 6 wt %. In a particular embodiment, the weld metal comprises chromium in an amount less than or equal to about 5 wt %, less than or equal to about 4 wt %, less than or equal to about 3 wt %, less than or equal to about 2 wt %, less than or equal to about 1 wt %, about 1 wt % to about 6 wt %, about 1 wt % to about 5 wt %, about 1 wt % to about 4 wt %, about 1 wt % to about 3 wt %, about 1 wt % to about 2 wt %, about 2 wt % to about 6 wt %, about 2 wt % to about 5 wt %, about 2 wt % to about 4 wt %, about 2 wt % to about 3 wt %, about 3 wt % to about 6 wt %, about 3 wt % to about 5 wt %, about 3 wt % to about 4 wt %, about 4 wt % to about 6 wt %, about 4 wt % to about 5 wt %, or about 5 wt % to about 6 wt %. In other embodiments, the weld metal comprises chromium in an amount of about 0.5 wt %, about 1 wt %, about 1.5 wt %, about 2 wt %, about 2.5 wt %, about 3 wt %, about 3.5 wt %, about 4 wt %, about 4.5 wt %, about 5 wt %, about 5.5 wt %, or about 6 wt %.

Molybdenum additions provide significant solid solution strengthening. Additions of molybdenum are important to achieving the required strength properties in the ER-HMS weld metal. The weld metal of the present disclosure can comprise molybdenum in an amount of less than or equal to about 4 wt %. In a particular embodiment, the weld metal comprises molybdenum in an amount less than or equal to about 3 wt %, less than or equal to about 2 wt %, less than or equal to about 1 wt %, about 1 wt % to about 4 wt %, about 1 wt % to about 3 wt %, about 1 wt % to about 2 wt %, about 2 wt % to about 4 wt %, about 2 wt % to about 3 wt %, or about 3 wt % to about 4 wt %. In other embodiments, the weld metal comprises chromium in an amount of about 0.5 wt %, about 1 wt %, about 1.5 wt %, about 2 wt %, about 2.5 wt %, about 3 wt %, about 3.5 wt %, or about 4 wt %.

Nickel additions can provide additional austenite stability and can improve weld metal toughness. Nickel additions at higher levels, however, can result in a decrease in strength. In some embodiments, the weld metal comprises nickel in an amount of less than or equal to about 5 wt %. In a particular embodiment, the weld metal comprises nickel in an amount less than or equal to about 4 wt %, less than or equal to about 3 wt %, less than or equal to about 2 wt %, less than or equal to about 1 wt %, about 1 wt % to about 5 wt %, about 1 wt % to about 4 wt %, about 1 wt % to about 3 wt %, about 1 wt % to about 2 wt %, about 2 wt % to about 5 wt %, about 2 wt % to about 4 wt %, about 2 wt % to about 3 wt %, about 3 wt % to about 5 wt %, about 3 wt % to about 4 wt %, or about 4 wt % to about 5 wt %. In other embodiments, the weld metal comprises nickel in an amount of about 0.5 wt %, about 1 wt %, about 1.5 wt %, about 2 wt %, about 2.5 wt %, about 3 wt %, about 3.5 wt %, about 4 wt %, about 4.5 wt %, or about 5 wt %.

There are several additional minor elemental additions that can be made to ER-HMS weld metals. Nitrogen and/or boron can be added in small quantities to provide additional solid solution strengthening, e.g., up to about 1.5 wt % and up to about 0.1 wt %, respectively. Nitrogen in higher quantities can cause weld metal porosity and degraded toughness. Tungsten may also be added to serve as a solid solution strengthener, e.g., in an amount of less than or equal to about 5 wt %. In a particular embodiment, the weld metal comprises tungsten in an amount less than or equal to about 4 wt %, less than or equal to about 3 wt %, less than or equal to about 2 wt %, less than or equal to about 1 wt %, about 1 wt % to about 5 wt %, about 1 wt % to about 4 wt %, about 1 wt % to about 3 wt %, about 1 wt % to about 2 wt %, about 2 wt % to about 5 wt %, about 2 wt % to about 4 wt %, about 2 wt % to about 3 wt %, about 3 wt % to about 5 wt %, about 3 wt % to about 4 wt %, or about 4 wt % to about 5 wt %. In other embodiments, the weld metal comprises tungsten in an amount of about 0.5 wt %, about 1 wt %, about 1.5 wt %, about 2 wt %, about 2.5 wt %, about 3 wt %, about 3.5 wt %, about 4 wt %, about 4.5 wt %, or about 5 wt %.

Titanium and niobium in small quantities can (e.g., less than or equal to about 2 wt %, and about 5 wt %, respectively) be added for grain refinement and precipitation hardening purposes to strengthen the weld metal. In a particular embodiment, the weld metal comprises titanium in an amount less than or equal to about 1 wt % or about 1 wt % to about 2. In other embodiments, the weld metal comprises titanium in an amount of about 0.5 wt %, about 1 wt %, about 1.5 wt %, or about 2 wt %. In a particular embodiment, the weld metal comprises niobium in an amount less than or equal to about 4 wt %, less than or equal to about 3 wt %, less than or equal to about 2 wt %, less than or equal to about 1 wt %, about 1 wt % to about 5 wt %, about 1 wt % to about 4 wt %, about 1 wt % to about 3 wt %, about 1 wt % to about 2 wt %, about 2 wt % to about 5 wt %, about 2 wt % to about 4 wt %, about 2 wt % to about 3 wt %, about 3 wt % to about 5 wt %, about 3 wt % to about 4 wt %, or about 4 wt % to about 5 wt %. In other embodiments, the weld metal comprises niobium in an amount of about 0.5 wt %, about 1 wt %, about 1.5 wt %, about 2 wt %, about 2.5 wt %, about 3 wt %, about 3.5 wt %, about 4 wt %, about 4.5 wt %, or about 5 wt %.

Sulfur and phosphorus are impurities and are not intentionally added. These elements are controlled by limiting their amount in the welding consumable. The quantities of sulfur and phosphorus must be controlled in order to avoid weld solidification cracking. For example, in an embodiment, sulfur and phosphorus are each present at a concentration no greater than about 200 ppm.

In a particular embodiment, the weld metal of the present disclosure has a microstructure comprising austenite grains with a small volume fraction of carbides.

In another embodiment, the weld metal has a yield strength in the as-welded condition greater than a yield strength of a high manganese steel base or greater than a required minimum yield strength.

In an embodiment, the weld metal has a yield strength in the as-welded condition greater than about 70 ksi. In a particular embodiment, the yield strength is greater than about 72.5 ksi, about 75 ksi, about 77.5 ksi, about 80 ksi, or about 82.5 ksi.

In some embodiments, the weld metal has an ultimate tensile strength in the as-welded condition greater than 82.7 ksi. In a particular embodiment, the ultimate tensile strength is greater than about 85 ksi, about 90 ksi, about 95 ksi, about 100 ksi, about 105 ksi, about 110 ksi, about 115 ksi, about 120 ksi, about 125 ksi, or about 130 ksi.

In other embodiments, the weld metal has a tensile elongation in the as-welded condition greater than about 16%. In a particular embodiment, the tensile elongation of the weld metal is greater than about 20%, about 25%, about 30%, about 35%, about 40%, about 45%, about 50%, about 55%, about 60%, or about 65%.

In further embodiments, the weld metal has a solidification cracking temperature range in the as-welded condition of about 40° C. to about 170° C. at 7% strain. In a particular embodiment, the solidification cracking temperature range at 7% strain is about 40° C. to about 160° C., about 40° C. to about 150° C., about 40° C. to about 140° C., about 40° C. to about 130° C., about 40° C. to about 120° C., about 40° C. to about 110° C., about 40° C. to about 100° C., about 40° C. to about 90° C., about 40° C. to about 80° C., about 40° C. to about 70° C., about 40° C. to about 60° C., about 50° C. to about 170° C., about 50° C. to about 160° C., about 50° C. to about 150° C., about 50° C. to about 140° C., about 50° C. to about 130° C., about 50° C. to about 120° C., about 50° C. to about 110° C., about 50° C. to about 100° C., about 50° C. to about 90° C., about 50° C. to about 80° C., about 50° C. to about 70° C., about 60° C. to about 170° C., about 60° C. to about 160° C., about 60° C. to about 150° C., about 60° C. to about 140° C., about 60° C. to about 130° C., about 60° C. to about 120° C., about 60° C. to about 110° C., about 60° C. to about 100° C., about 60° C. to about 90° C., about 60° C. to about 80° C., about 70° C. to about 170° C., about 70° C. to about 160° C., about 70° C. to about 150° C., about 70° C. to about 140° C., about 70° C. to about 130° C., about 70° C. to about 120° C., about 70° C. to about 110° C., about 70° C. to about 100° C., about 7° C. to about 90° C., about 80° C. to about 170° C., about 80° C. to about 160° C., about 80° C. to about 150° C., about 80° C. to about 140° C., about 80° C. to about 130° C., about 80° C. to about 120° C., about 80° C. to about 110° C., about 80° C. to about 100° C., about 90° C. to about 170° C., about 90° C. to about 160° C., about 90° C. to about 150° C., about 90° C. to about 140° C., about 90° C. to about 130° C., about 90° C. to about 120° C., about 100° C. to about 170° C., about 100° C. to about 160° C., about 100° C. to about 150° C., about 100° C. to about 140° C., about 100° C. to about 130° C., about 100° C. to about 120° C., about 110° C. to about 170° C., about 110° C. to about 160° C., about 110° C. to about 150° C., about 110° C. to about 140° C., about 110° C. to about 130° C., about 130° C. to about 170° C., about 130° C. to about 160° C., about 130° C. to about 150° C., or about 140° C. to about 170° C.

In another embodiment, the weld metal has a CVN energy in the as-welded condition greater than about 27 J at −29° C. In a particular embodiment, the weld deposit has a CVN energy at −29° C. in the as-welded condition greater than about 30 J, about 35 J, about 40 J, about 45 J, about 50 J, about 55 J, about 60 J, about 65 J, about 70 J, about 75 J, or about 80 J.

According to another embodiment of the present disclosure, a system for applying the weld metal of the present disclosure is provided. The application of sound ER-HMS welds produced at practical productivity for slurry pipeline construction can be accomplished with recently developed welding technology. GMAW welding machines are available in industry that enable good weldability for ER-HMS welds. Manufacturers of GMAW power sources have incorporated advanced pulsed waveform control through the use of sophisticated solid state electronics. This waveform control allows for improvement and optimization of weldability. This type of welding is typically referred to as pulsed GMAW or PGMAW. These PGMAW machines have been in existence for many years, yet only recently have waveform controls become advanced enough to enable the level of optimization most beneficial for ER-HMS field construction.

The system may use welding equipment and parameters to control of weld arc stability and weld pool flow characteristics, such as viscosity and bead shape to provide acceptable weldability. The system for providing erosion/corrosion resistant high manganese welds comprises a consumable wire electrode and a gas metal arc welding power source that perform gas metal arc welding. The consumable wire electrode produces a weld metal comprising carbon in a range of about 0.4 wt % to about 0.8 wt %, manganese in a range of about 18 wt % to about 24 wt %, chromium in an amount less than or equal to about 6 wt %, molybdenum in an amount of less than or equal to about 4 wt %, nickel in an amount of less than or equal to about 5 wt %, silicon in a range of about 0.4 wt % to about 1.0 wt %, sulfur in an amount of less than or equal to about 200 ppm, phosphorus in an amount of less than or equal to about 200 ppm, and a balance comprising iron. The gas metal arc welding power source produces a welding heat input no more than about 2.5 kJ/mm.

In another embodiment, the welding heat input is in a range of about 0.6 to about 1.0 kJ/mm.

In some embodiment, the system further comprises an apparatus for providing at least one shielding gas, wherein the at least one shielding gas includes $CO_2$ in a range of about 10% to about 30%.

In a particular embodiment, the at least one shielding gas is 80% Argon and 20% $CO_2$.

Weldability:

In an embodiment, for field high Mn steel construction (e.g., slurry pipeline construction), ER-HMS welds are preferably made using GMAW-based processes, and particularly PGMAW, although other processes can be used provided that the specified chemistry and microstructure are achieved and the weldability is satisfactory for the application. Advanced pulsing welding power supplies are important for achieving good weldability for ER-HMS field construction. Several examples of these power supplies are the Fronius TransSynergic 3200, the Lincoln Power Wave 455, and the Miller PipePro 450.

A system for applying the ER-HMS welds to 1G or 5G girth welds in an embodiment of the present disclosure includes the use of background current of about 75 to about 150 amps and pulse current magnitudes of about 350 to about 450 amps. An example of a pulsing current waveform is shown in FIG. 1. Arc voltage can range from about 15V to about 30V. Wire feed speeds can range from about 80 to about 500 inches per minute (ipm) for about 1.2 mm diameter wire. Shielding gas flow rates can range from about 10 to about 50 cubic feet per hour (cfh). Travel speeds can range from about 1 to about 18 ipm for root welding and from about 1 to about 25 ipm for the fill and cap passes. Filler wire can range from about 0.9 mm to about 1.6 mm in diameter. Heat inputs can range from about 15 to about 26 kJ/inch for both the root and fill passes.

According to another embodiment of the present disclosure, a method for applying the weld metal of the present disclosure is provided. The method uses, e.g., welding equipment and parameters that enable control of weld arc stability and weld pool flow characteristics, such as viscosity and bead shape to provide acceptable weldability. In an embodiment, the weld metal chemistry, weld joint geometry, and welding input are controlled to ensure reduced susceptibility to solidification cracking and prevent significant degradation of weld metal and heat affected zone (HAZ) toughness.

The method of producing a weld deposit of erosion/corrosion resistant high Mn steel comprises: providing at least two high Mn steel bases to be welded and a welding filler metal; and melting and cooling the welding filler material to create a weld deposit. The welding filler metal comprises carbon in a range of about 0.4 wt % to about 0.8 wt %, manganese in a range of about 18 wt % to about 24 wt %, chromium in an amount of less than or equal to about 6 wt %, molybdenum in an amount of less than or equal to about 4 wt %, nickel in an amount of less than or equal to about 5 wt %, silicon in a range of about 0.4 wt % to about 1.0 wt %, sulfur in an amount of less than or equal to about 200 ppm, phosphorus in an amount of less than or equal to about 200 ppm, and a balance comprising iron.

In certain embodiments, melting comprises applying a welding heat input of about 2.5 kJ/mm or less to the welding filler metal/welding consumable wire composition.

In a particular embodiment, the at least two high Mn steel bases comprise a portion to be welded, the portions having bevels of about 30 degrees to about 37.5 degrees.

In an embodiment, a heat affected zone of the bases has a CVN energy after welding greater than about 27 J at $-29°$ C. In a particular embodiment, the heat affected zone of the bases has a CVN energy at $-29°$ C. after welding greater than about 30 J, about 35 J, about 40 J, about 45 J, about 50 J, about 55 J, about 60 J, about 65 J, about 70 J, about 75 J, or about 80 J.

In some embodiment, the base metal is an erosion/corrosion resistant high Mn steel.

In an embodiment, the method further comprises limiting carbon dilution in the base metal. For example, the method can further comprise limiting carbon content in the weld metal to an amount less than an amount of carbon in a heat affected zone of the base metal. In an embodiment, the weld metal comprises carbon in an amount no greater than about 0.8 wt % and the base metal comprises carbon in an amount of at least about 1.0 wt. % (e.g., about 1.0 wt % to about 3.0 wt %).

In an embodiment, the weld metal yield strength is greater than the yield strength of the erosion resistant HMS base pipe or greater than the specified minimum yield strength (SMYS) required by the slurry pipeline design. In another embodiment, the weld metal ultimate tensile strength is greater than the specified minimum ultimate tensile strength (SMUTS) for the base pipe body. In an additional embodiment, the weld metal must provide some minimum specified level of tensile elongation.

Figure 2A:
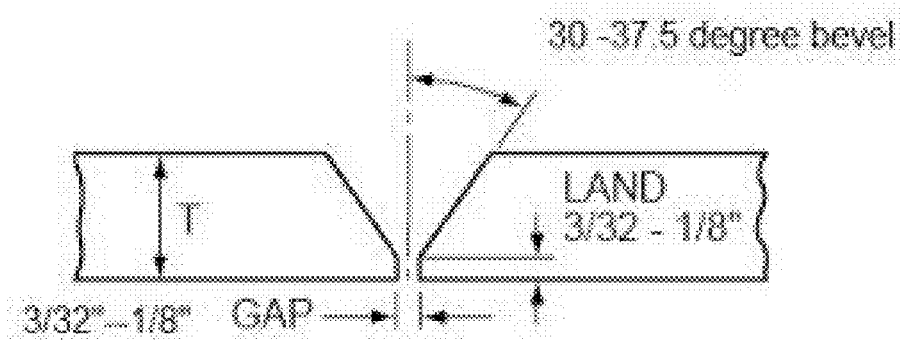
FIGS. 2A and 2B each illustrate an open bevel in accordance with an embodiment of the present disclosure.
Figure 2B:
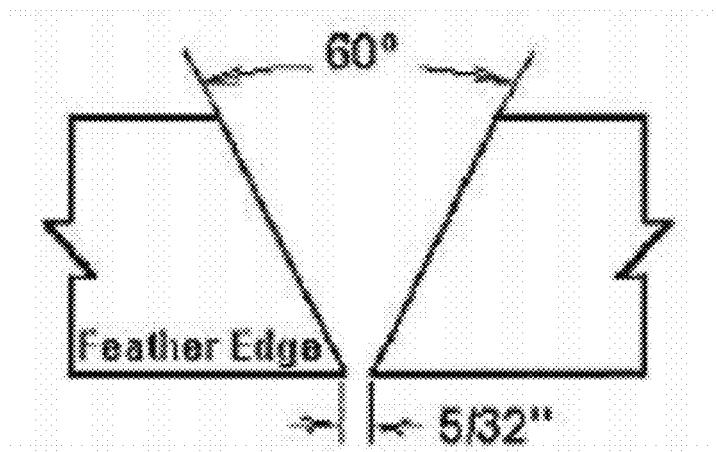

In an embodiment, the ER-HMS weld metals solidify as primary austenite, which may make them susceptible to weld solidification cracking. Any weld solidification cracking is unacceptable for fabrication of slurry pipes, and thus the ER-HMS weld metals must provide adequate resistance to solidification cracking during welding using practical welding parameters. Proper control of weld metal chemistry to avoid solidification cracking in ER-HMS weld metals. Furthermore, controlling the consumable wire composition ensures proper levels of alloying elements and minimum levels of impurity elements, such as sulfur and phosphorus, can also help to avoid solidification cracking. In another embodiment, dilution of the base metal is managed to ensure that the weld metal composition range is within the proper range. The base metal HMS has higher carbon content than the ER-HMS welding consumable, and thus greater dilution leads to greater solidification cracking susceptibility. In an embodiment, the dilution level is controlled by restricting maximum heat input and prescribing weld bead sequences. Solidification cracking is also dependent on the magnitude and location of weld residual stresses that develop during weld metal solidification. The use of specific weld bevel geometries can lead to more favorable weld residual stresses and improved resistance to solidification cracking in ER-HMS weld metals. Open bevels with larger included angles result in weld beads with lower depth-to-width ratios, which reduces solidification cracking susceptibility compared to narrow bevels with smaller included angles and larger thermally induced stresses. For example, in an embodiment, a bevel for a pipe girth welding includes an opening (gap) that is about 3/32 of an inch to about 1/8 inch in height, as shown in FIG. 2A. Furthermore, the opening can have a height (land) in a range of about 3/32 of an inch to about 1/8 inch. The bevel can have a bevel angle of about 30 degrees to about 37.5 degrees. In another embodiment, the open bevel does not have a height, but rather the bevel starts from one surface of the base and proceeds substantially in a straight line to the other surface of the base, as shown in FIG. 2B. In this embodiment, the opening can be about 1/32 of an inch to about 5/32 of an inch wide (e.g., 5/32").

In an embodiment, the ER-HMS consumables have similar manganese content as the erosion resistant HMS base metal, which produces a weld metal microstructure similar to the base metal microstructure in that both are austenitic. This chemical compatibility prevents formation of martensitic phases at the weld metal/base metal interface. This reduces the risk of potential issues, such as cold cracking/hydrogen cracking.

In another embodiment, the high Mn steel base is as provided for and described in 2013 EM118, PCT/US2014/020599 entitled "Enhanced Wear Resistant Steel and Methods of Making the Same", herein incorporated by reference.

Proper control of the welding shielding gas composition can help to in produce sound ER-HMS welds with the required properties. The viscous nature of the ER-HMS weld metals is overcome through the use of $CO_2$ in the shielding gas. The $CO_2$ in the shielding gas serves to improve weld pool fluidity, arc stability, and bead geometry including penetration profile. All of these attributes are important to avoid weld defects in pipeline welding. The use of $CO_2$, however, increases the oxygen potential and can increase oxygen content in the weld metal. Excessive formation of oxides in the weld metal can result in degraded toughness. Therefore, in an embodiment, the amount of $CO_2$ in the shielding gas is controlled between 10% and 30%. In another embodiment, the ER-HMS weld technology applies a shielding gas with a composition of 80% Ar/20% $CO_2$.

The weld bead profiles of ER-HMS welds should be properly controlled to minimize risk of solidification cracking. In certain embodiments, highly concave bead profiles are avoided, as these are susceptible to solidification cracking. The bead profiles can be controlled with proper control of welding current, wire feed speed, and welding travel speed.

When using cored wire consumables to apply ER-HMS welds, it is important to avoid typical welding problems that can be associated with cored wire welding processes such as metal cored arc welding (MCAW) and flux cored arc welding (FCAW). Such potential problems include excessive spatter and weld metal porosity. The use of $CO_2$ in the shielding gas, as described above, can reduce spatter. Weld metal porosity can be reduced or avoided through proper cleaning practices, for example, the weld joint and consumable wire dry and clean, free from oil and other debris. Proper consumable wire storage practices (temperature and humidity) should be followed, as cored wire consumables have a greater tendency than solid wire consumables to collect moisture when stored improperly.

The welding process parameters can be controlled to produce a welding heat input that results in sound ER-HMS welds with suitable microstructures and properties for the slurry pipe application. The welding heat input should be high enough to enable consistent fusion at practical productivities for pipeline welding. It should be controlled, however, below a maximum of about 2.5 kJ/mm to ensure a weld that meets the requirements. Welding parameters (current, voltage, and travel speed) can be adjusted to ensure the welding heat input value is not exceeded. Excessive heat input beyond the maximum can result in a number of potential issues, including: solidification cracking, reduced weld metal toughness, and reduced base metal HAZ toughness.

Welding heat input can be controlled below the maximum value to avoid producing large weld beads with high depth to width ratios that can be prone to solidification cracking. These high depth to width ratios can increase segregation in the weld metal and increase transverse strains in the girth weld joint, thus increasing the likelihood of solidification cracking.

An additional reason to control the welding heat input below the maximum value is to prevent excessive weld interpass carbide precipitation. In multi-pass welding, as used for ER-HMS welds, each subsequent welding pass produces a thermal cycle that impacts the weld metal bead from the previous pass. If the heat input is too large, this weld metal reheating can result in carbide precipitation in the weld metal. Excessive carbide formation can degrade the weld metal toughness below the requirement.

Further, welding heat input control is key to maintaining the required toughness in the HMS base metal HAZ. It is understood that a heat input that is too high will result in excessive carbide precipitation on grain boundaries in the base metal HAZ. This can lead to local areas with reduced toughness. Welding heat input controlled below the maximum value results in a thermal cycle and cooling rate that produces a reduced amount of carbide precipitates at the HAZ grain boundaries. This improves the fracture toughness and resistance to cracking. Proper heat input control, therefore, is needed to ensure the required toughness is met in both the ER-HMS weld metal and the HMS base metal HAZ.

Proper application of the weld metal chemistries, welding processes, and welding practices described above will produce suitable ER-HMS welds with microstructures and mechanical properties required to construct HMS slurry pipelines. The novel ER-HMS weld metal can be applied at practical productivities using modern pipeline welding equipment in both e.g., the 1G and 5G welding positions, and can also be applied to produce girth weld repair welds.

An embodiment of the present disclosure comprises a method of producing ER-HMS welds for specific application requirements. The method comprises determining the desired ER-HMS weld metal chemistry within the effective ranges disclosed herein. In an embodiment, the method includes determining the welding consumable wire chemistry given the base metal chemistry and the desired weld metal chemistry. In some embodiments, determining the welding consumable wire chemistry comprises performing dilution calculations as discussed previously. In some embodiments, the method further comprises welding the base metal using the welding consumable wire. In a particular embodiment, welding the base metal includes controlling the arc stability and weld pool flow characteristics during welding to provide satisfactory weldability and weld fusion.

EXAMPLES

Welding Consumable Chemistry Selection Approach:

Based on the understanding of these alloying element effects on microstructure, phase transformations, and properties, appropriate ER-HMS weld metal chemistries can be designed for the application. The proper selection of consumable chemistries can be facilitated by screening using calculated material property predictions. Calculated phase diagrams can be used to predict key material properties over elemental concentration ranges. In such a case as ER-HMS weld metal chemistries, with numerous possible alloying elements and concentration ranges, it is beneficial to utilize a design of experiments approach to analyze independent and dependent variables. An example of this type of factorial design approach is eight variables (alloying elements) at three concentrations each, as is shown in Table 1, which gives $3^8$ or 6,561 experimental conditions (compositions).

TABLE 1

Concentrations for eight elements utilized in the preliminary analysis of 6,561 experimental conditions.

| | Min | Mid | Max | Comments |
|---|---|---|---|---|
| C | 0.4 | 0.6 | 0.8 | Solid solution strengthener; reduces IG cracking |
| Mn | 18 | 21 | 24 | TRIP/TWIP-ability |
| Si | 0.4 | 0.7 | 1 | Improve weldability by increasing viscosity |
| Cr | 0 | 3 | 6 | General corrosion resistance |
| Mo | 0 | 2 | 4 | Erosion and corrosion resistance |
| N | 0 | 0.03 | 0.06 | Solid solution strengthener; replacement for C |
| Ni | 0 | 2.5 | 5 | TRIP/TWIP-ability; austenite stabilizer |
| Al | 0 | 0.5 | 1 | Austenite stabilizer |

After generating the experimental weld metal compositions through a design of experiments factorial approach, key thermodynamic parameters can be calculated for each composition for purposes of initial screening. Three key parameters that can be used to predict ER-HMS weld metal performance are: (i) stacking fault energy, (ii) solidification temperature range, and (iii) cementite solvus temperature. The parameters were predicted with Thermo-Calc (Thermo-Calc Software AB, Stockholm, Sweden).

Stacking fault energy (SFE) is a function of alloy chemistry, and the value of the SFE corresponds to the types of transformation induced plasticity (TRIP) and twinning induced plasticity (TWIP) mechanisms that occur in high Mn steels during deformation. The specific active deformation mechanisms impact the strength and erosion performance of the weld metal. Based on this, the SFE value is an important parameter in consumable alloy design because it is viewed as a strong predictor of tensile strength and erosion performance. The preferred ER-HMS weld metal SFE values are targeted to be similar to the base metal erosion resistant HMS SFE values (e.g., greater than 60 mJ/m² and less than 80 mJ/m²).

The solidification temperature range (STR) is the range between the liquidus temperature and the solidus temperature for a given alloy composition. The STR is a strong indicator of weldability as it is representative of the span of the mushy zone during solidification (weld metal solidification in this case). A higher value for STR correlates to a larger mushy zone and a higher susceptibility to weld solidification cracking. The ER-HMS weld metals solidify as primary austenite, which inherently makes them somewhat prone to weld solidification crack defects. The STR must be controlled to minimize solidification cracking susceptibility to allow for defect free pipeline girth welds. The preferred calculated STR values for the ER-HMS weld metal are targeted to be less than 120° C. to provide the best performance.

The cementite solvus temperature (CST) can be used to provide a relative estimate of carbide precipitation in the weld metal during solidification and multiple weld pass reheating. This temperature can be predicted based on alloy composition. The amount of carbide precipitation will be minimized when the CST is minimized. It is understood that excessive carbide precipitation in the weld metal will have a negative impact on weld metal toughness (a key mechanical property). As such, it is preferred that the ER-HMS weld metal composition produces a CST that is minimized.

Figure 3:
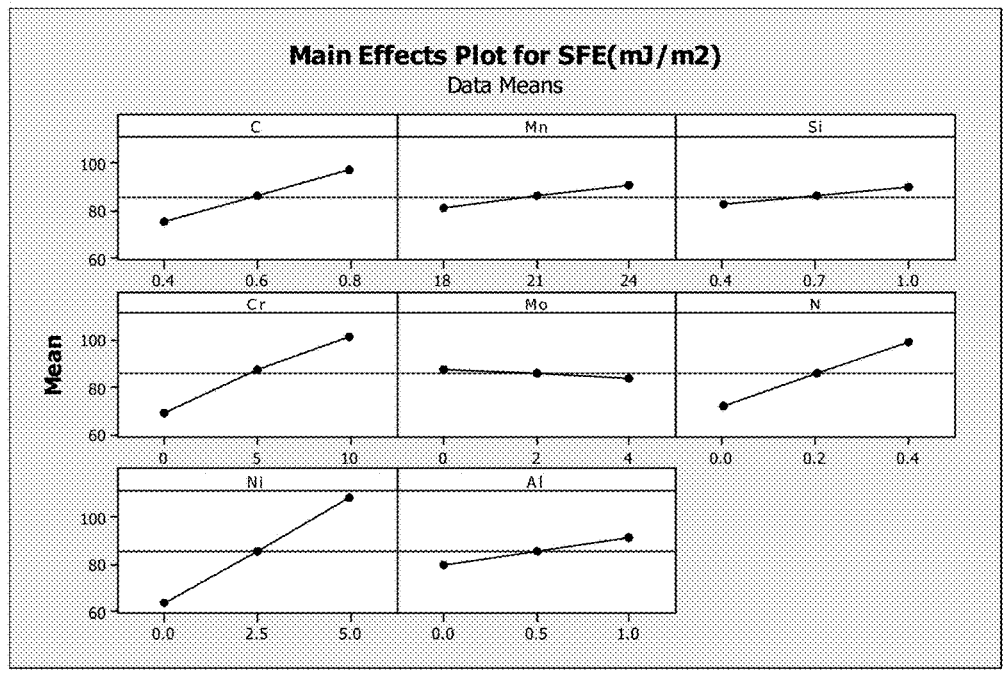
FIG. 3 is a series of plots showing changes in calculated stacking fault energy (SFE) as a function of different alloying additions.
Figure 4:
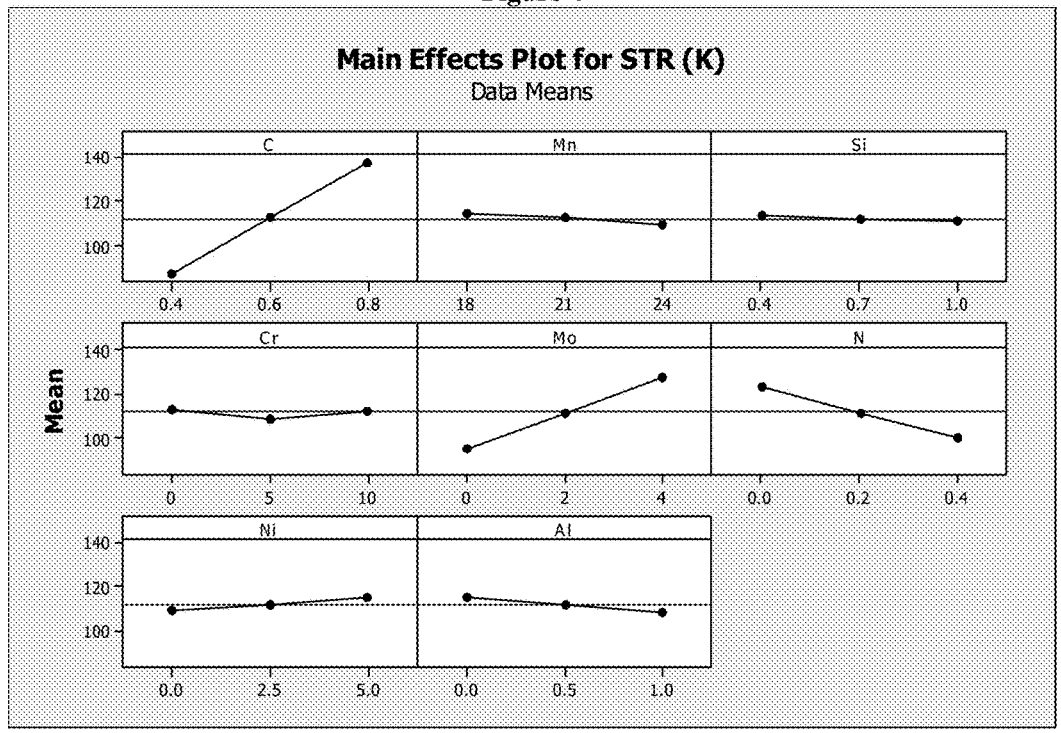
FIG. 4 is a series of plots showing changes in calculated solidification temperature range (STR) as a function of different alloying additions.
Figure 5:
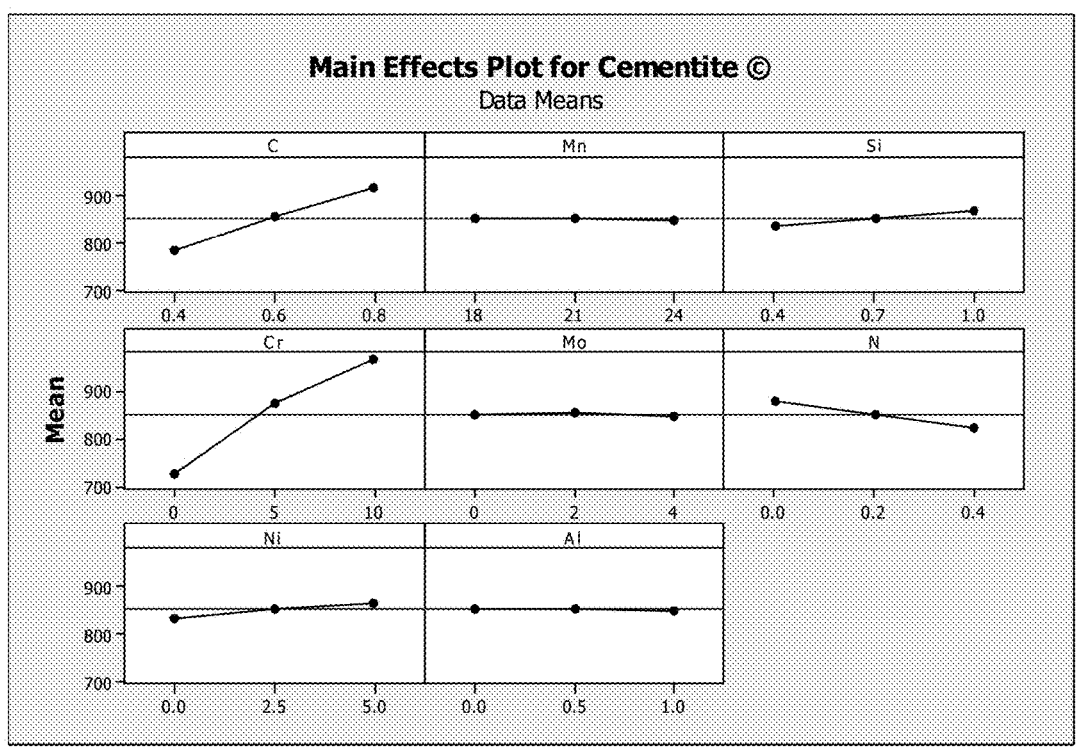
FIG. 5 is a series of plots showing changes in calculated cementite solvus temperature (CST) as a function of different alloying additions.

Using the thermodynamic calculations of the key parameters described, the most promising consumable chemistries were selected for further evaluation and development. Additionally, statistics describing the variation in key parameters with elemental variations were analyzed and trends identified regarding the effect of different elemental variations on calculated parameters. For example, FIGS. 3, 4, and 5 show plots representing the change in SFE, STR, and CST, respectively, as a function of the different alloying additions. In FIG. 3, for example, the main effects come from variations in carbon, chromium, nickel, and nitrogen content. The statistical analysis of elemental effects on key parameters enabled selection of chemistry ranges for physical welding assessments (a much smaller set of chemistries than assessed with thermodynamic calculations).

Figure 6:
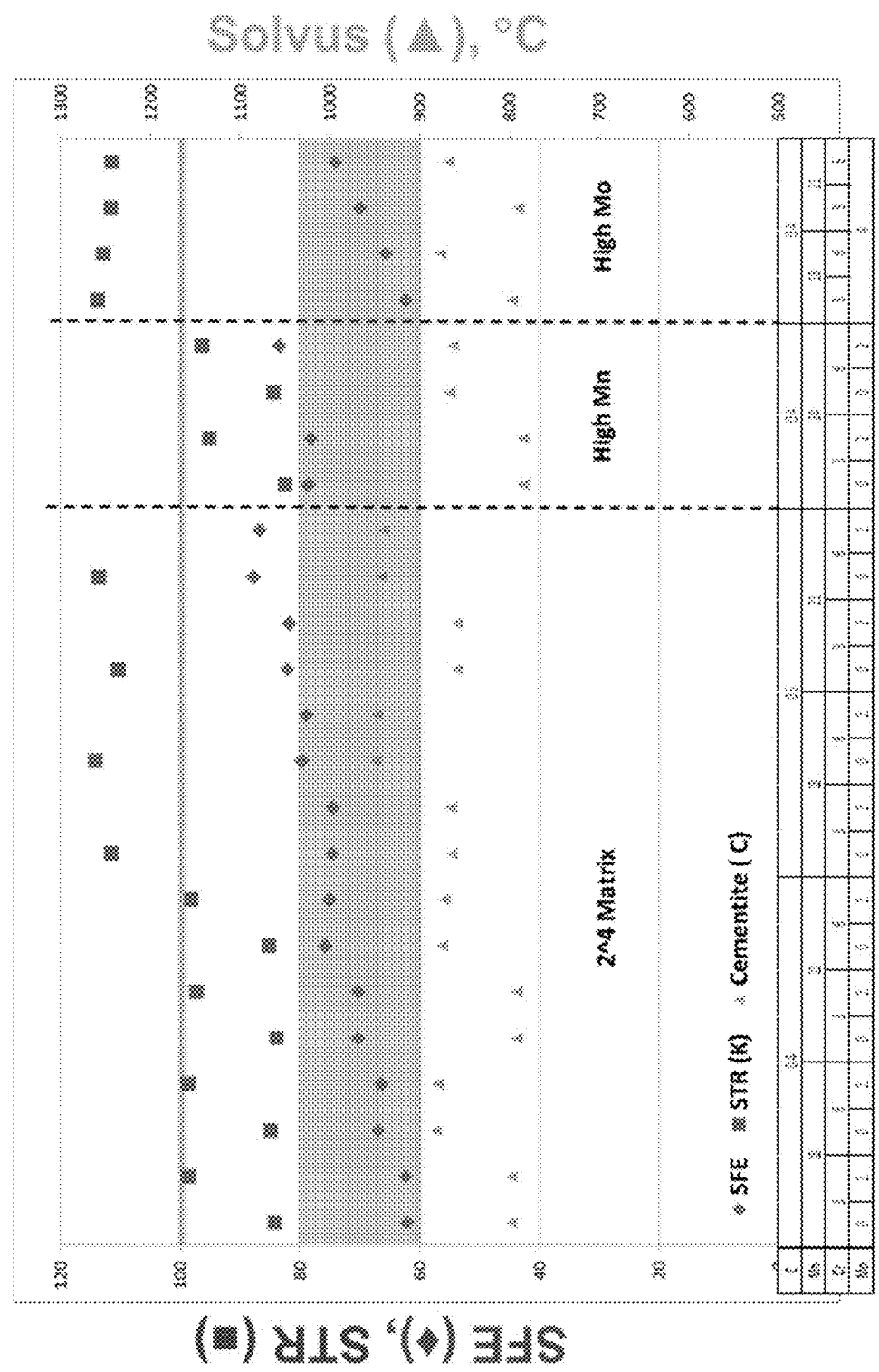
FIG. 6 is a plot showing the key thermodynamic parameters for the consumable chemistries produced for physical welding assessments and testing.

The chemistry ranges for ER-HMS consumables alloys for physical welding assessments can be selected based on best fit to the calculated thermodynamic criteria (SFE, STR, CST) that would allow a factorial experimental design. The contents of several elements can be fixed, while four elements can be selected (carbon, manganese, molybdenum, and nickel) to vary between two values. This produces $2^4$ or 16 experimental conditions. This can be supplemented with a subset of higher manganese consumables and a subset of consumables with some microalloying additions of titanium, niobium, tungsten, boron, and nitrogen. In total, there are 22 experimental consumable chemistries that were produced for physical welding assessments and testing, as shown in Table 2. FIG. 6 shows a plot of the key thermodynamic parameters for these consumable chemistries.

TABLE 2

ER-HMS consumable chemistries produced for physical welding assessments.

|  | C | Mn | Mo | Ni | Cr | Si | Al | Others | Name |
|---|---|---|---|---|---|---|---|---|---|
| $2^4$ Experiment | 0.4 | 18 | 2 | 0 | 3 | 0.4 | — | — | FX-1 |
|  |  |  |  | 5 |  |  |  |  | FX-9 |
|  |  |  | 4 | 0 |  |  |  |  | FX-10 |
|  |  |  |  | 5 |  |  |  |  | FX-2 |
|  |  | 21 | 2 | 0 |  |  |  |  | FX-11 |
|  |  |  |  | 5 |  |  |  |  | FX-4 |
|  |  |  | 4 | 0 |  |  |  |  | FX-3 |
|  |  |  |  | 5 |  |  |  |  | FX-12 |
|  | 0.6 | 18 | 2 | 0 |  |  |  |  | FX-5 |
|  |  |  |  | 5 |  |  |  |  | FX-13 |
|  |  |  | 4 | 0 |  |  |  |  | FX-14 |
|  |  |  |  | 5 |  |  |  |  | FX-6 |
|  |  | 21 | 2 | 0 |  |  |  |  | FX-15 |
|  |  |  |  | 5 |  |  |  |  | FX-8 |
|  |  |  | 4 | 0 |  |  |  |  | FX-7 |
|  |  |  |  | 5 |  |  |  |  | FX-16 |
| Minor Additions Subset | 0.5 | 22 | 2.5 | 0 | 4 | 0.4 | — | Ti, Nb, W, B |  |
|  |  |  |  |  |  |  |  | Ti, Nb, W, B, N |  |
| High Mn Subset | 0.4 | 24 | 2 | 0 | 3 | 0.4 | — | — | FX17-FX20 |
|  |  |  |  | 5 |  |  |  |  |  |
|  |  |  | 4 | 0 |  |  |  |  |  |
|  |  |  |  | 5 |  |  |  |  |  |

Physical Welding Assessments:

The experimental ER-HMS consumables were assessed by producing welds and testing mechanical properties, weldability, and erosion resistance. The ER-HMS assessment welds were made as butt welds (either of plate or of pipe) of erosion resistant HMS base metal. The butt welds were performed under the following MCAW conditions: an arc voltage of 26-30V, an arc current 140-180 A, at a wire feed of 250-300 ipm with a filler wire of 1.2 mm in diameter, shielding gas flow rate of 45 cfh with 80 Ar/20 $CO_2$, and a heat inputs of 0.74-1.1 kJ/mm for both the root and fill passes.

Figure 7:
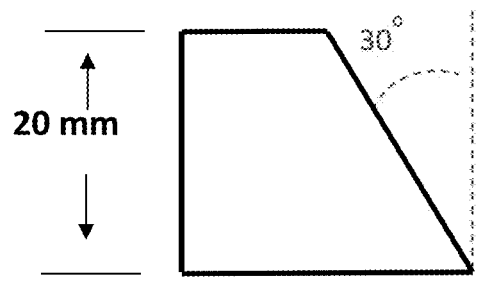
FIG. 7 is a drawing of a bevel design that can be used for physical welding assessments of ER-HMS consumables.
Figure 8A:
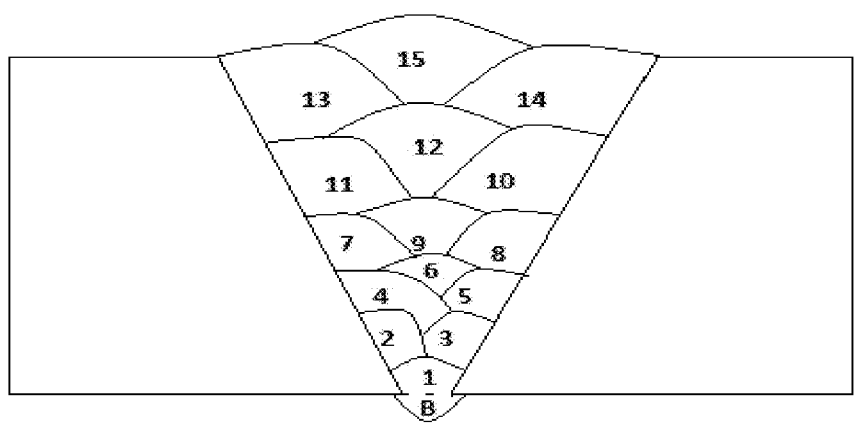
FIG. 8A is a weld bead sequence for physical welding assessments of ER-HMS consumables in accordance with an embodiment of the present disclosure.
Figure 8B:
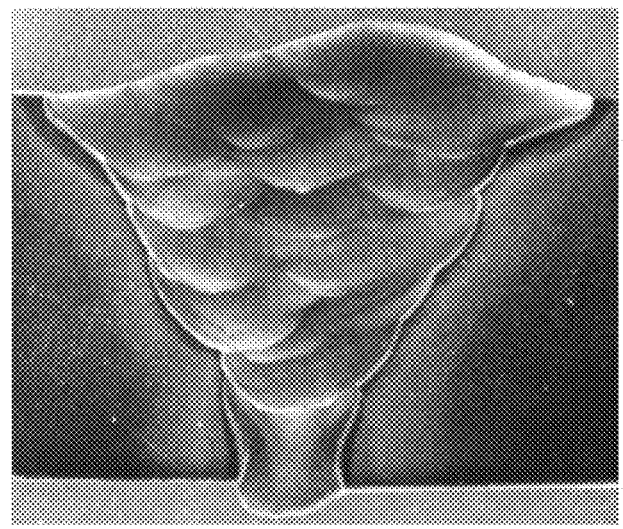
FIG. 8B is a weld macro for the weld bead sequence shown in FIG. 8A.

Sufficient weld metals were produced to allow for appropriate mechanical testing and microstructural analysis. An example of the bevel design for such a plate weld is shown in the diagram in FIG. 7. An example of the weld bead sequence for such a plate weld is shown in the drawing in FIG. 8A, and a typical weld macro for such a plate is shown in FIG. 8B.

Testing of ER-HMS test welds were conducted to demonstrate that the welds produce adequate strength, adequate toughness, and high erosion/corrosion resistance required for slurry pipelines. An example of a series of ER-HMS welds produced and tested for strength and toughness is shown in Table 3.

specified level of tensile elongation. The ER-HMS weld metal can achieve each of these measurements because it is designed to contain a highly metastable austenite phase, which transforms into hard α'-martensite and undergoes

TABLE 3

ER-HMS weld tensile and impact toughness properties

| | C | Mn | Mo | Ni | Cr | Si | Av. YS (MPa) | Av. TS (MPa) | Av. EI (%) | Av. $EJ_{0°\,C.}$ | Av. $EJ_{-29°\,C.}$ |
|---|---|---|---|---|---|---|---|---|---|---|---|
| FX-1 | 0.4 | 18 | 2 | 0 | 3 | 0.4 | | | | | |
| | 0.489 | 19.46 | 2.25 | 0.008 | 3.532 | 0.301 | 461.9 | 823.6 | 49.5 | 90.4 | 81.3 |
| FX-9 | 0.4 | 18 | 2 | 5 | 3 | 0.4 | | | | | |
| | 0.337 | 19.68 | 2.054 | 5.455 | 3.192 | 0.429 | 469.9 | 713 | 52 | 105.3 | 102.1 |
| FX-10 | 0.4 | 18 | 4 | 0 | 3 | 0.4 | | | | | |
| | 0.371 | 19.73 | 4.4046 | 0.057 | 3.168 | 0.549 | 494.7 | 835 | 50 | 74.1 | 68.7 |
| FX-2 | 0.4 | 18 | 4 | 5 | 3 | 0.4 | | | | | |
| | 0.45 | 19.99 | 4.472 | 5.969 | 3.629 | 0.407 | 500.6 | 763.9 | 46 | 77.7 | 70.1 |
| FX-11 | 0.4 | 21 | 2 | 0 | 3 | 0.4 | | | | | |
| | 0.389 | 21.5 | 2.078 | 0.008 | 3.191 | 0.387 | 477.5 | 800.5 | 51.5 | 91.7 | 79.1 |
| FX-4 | 0.4 | 21 | 2 | 5 | 3 | 0.4 | | | | | |
| | 0.507 | 21.79 | 2.392 | 5.806 | 3.644 | 0.377 | 504 | 746.7 | 50.5 | 96.3 | 95.3 |
| FX-3 | 0.4 | 21 | 4 | 0 | 3 | 0.4 | | | | | |
| | 0.496 | 21.49 | 4.324 | 0.011 | 3.52 | 0.44 | 543.3 | 847 | 45.5 | 55.6 | 56.9 |
| FX-12 | 0.4 | 21 | 4 | 5 | 3 | 0.4 | | | | | |
| | 0.372 | 21.88 | 3.951 | 5.181 | 3.113 | 0.546 | 496.4 | 745 | 53.5 | 103.9 | 93.1 |
| FX-5 | 0.6 | 18 | 2 | 0 | 3 | 0.4 | | | | | |
| | 0.701 | 19.51 | 2.237 | 0.012 | 3.618 | 0.325 | 553.6 | 908 | 51.5 | 87.2 | 76.9 |
| | 0.6 | 19.8 | 2.25 | 0.01 | 3.47 | 0.4 | | | | | |
| FX-13 | 0.6 | 18 | 2 | 5 | 3 | 0.4 | | | | | |
| | 0.569 | 19.88 | 2.017 | 5.184 | 3.114 | 0.452 | 523.3 | 784.3 | 50.5 | 108.0 | 91.7 |
| FX-14 | 0.6 | 18 | 4 | 0 | 3 | 0.4 | | | | | |
| | 0.529 | 20.16 | 3.957 | 0.009 | 3.164 | 0.512 | 573.3 | 915.3 | 42.5 | 72.3 | 61.9 |
| | 0.58 | 18.7 | 4.13 | 0.01 | 3.14 | 0.47 | | | | | |
| FX-6 | 0.6 | 18 | 4 | 5 | 3 | 0.4 | | | | | |
| | 0.769 | 20.69 | 4.258 | 5.48 | 3.556 | 0.445 | 598.8 | 864.9 | 36 | 50.6 | 38.4 |
| FX-15 | 0.6 | 21 | 2 | 0 | 3 | 0.4 | | | | | |
| | 0.59 | 22.19 | 2.031 | 0.007 | 3.135 | 0.376 | 520.2 | 868.8 | 52.5 | 89.5 | 82.3 |
| FX-8 | 0.6 | 21 | 2 | 5 | 3 | 0.4 | | | | | |
| | 0.705 | 21.9 | 2.257 | 5.888 | 3.665 | 0.329 | 566.4 | 841.5 | 47 | 87.7 | 86.8 |
| | 0.58 | 21.4 | 2.3 | 5.35 | 3.22 | 0.4 | | | | | |
| FX-7 | 0.6 | 21 | 4 | 0 | 3 | 0.4 | | | | | |
| | 0.726 | 21.77 | 4.547 | 0.009 | 3.783 | 0.416 | 609.5 | 887.7 | 33.5 | 47.9 | 34.3 |
| FX-16 | 0.6 | 21 | 4 | 5 | 3 | 0.4 | | | | | |
| | 0.562 | 22.25 | 3.927 | 5.214 | 3.129 | 0.498 | 550.9 | 812.6 | 50 | 80.0 | 69.6 |
| | 0.56 | 21.85 | 4.2 | 5.28 | 3.23 | 0.46 | | | | | |
| FX-17 | 0.4 | 24 | 2 | 0 | 3 | 0.4 | | | | | |
| | 0.387 | 23.95 | 2.204 | 0.013 | 3.305 | 0.388 | 430.6 | 729.5 | 50.8 | 88.1 | 84.1 |
| FX-18 | 0.4 | 24 | 2 | 5 | 3 | 0.4 | | | | | |
| | 0.419 | 24.11 | 2.129 | 5.312 | 3.195 | 0.423 | 504.7 | 728.8 | 49.5 | 101.7 | 101.2 |
| FX-19 | 0.4 | 24 | 4 | 0 | 3 | 0.4 | | | | | |
| | 0.426 | 23.91 | 4.239 | 0.007 | 3.215 | 0.486 | 498.5 | 801.9 | 49.5 | 71.4 | 68.2 |
| FX-20 | 0.4 | 24 | 4 | 5 | 3 | 0.4 | | | | | |
| | 0.417 | 23.06 | 4.247 | 5.355 | 3.159 | 0.433 | 540.2 | 767.4 | 47.5 | 88.6 | 71.9 |

Weld Metallurgy, Microstructure, and Mechanical Properties:

The novel ER-HMS weld metal can provide the required strength, toughness, and high erosion/corrosion resistance to join erosion resistant HMS slurry pipe through girth butt welding. The microstructures required to meet these property requirements are achieved through proper control of weld metal chemistry and welding process parameters.

The ER-HMS weld metal must achieve the minimum tensile strength properties required for the application (slurry pipe). As such, it is desirable for the weld metal yield strength to be greater than the yield strength of the erosion resistant HMS base pipe or greater than the specified minimum yield strength (SMYS) required by the slurry pipeline design. Moreover, a weld metal ultimate tensile strength greater than the specified minimum ultimate tensile strength (SMUTS) for the base pipe body is also desirable. Furthermore, the weld metal should also provide some minimum microtwinning upon straining. Additionally, the solid solution strengthening elements in the weld metal (e.g., molybdenum) provide additional strengthening by disrupting lattice dislocation motion. The combination of these strengthening mechanisms provides a high strength and work hardening rate that achieves the tensile strength requirements for girth welds of typical slurry pipelines. As an example, tested ER-HMS weld metal properties are shown in Table 4 and compared to girth weld requirements for API X70 grade based pipeline design (SMYS is 70 ksi). The welds were performed with a mechanized MCAW under the following conditions: 80 Ar/20 $CO_2$ shielding gas as a flow rate of 40-50 cfh, arc voltage of 20-22 V for roots and 20-31 V for fills, an arc current of 150-190 A for roots and 210-265 A for fills, a filler wire having a diameter of 1.2 mm, a wire feed of 230 ipm for the root and 330-440 ipm for fills, and heat input of 0.86-1.02 kJ/mm for roots and 0.6-0.93 kJ/mm for fills. The API X70 grade design is common for oil sands slurry pipeline design. Modifications to ER-HMS weld metal chemistry can be made within the ranges disclosed here to achieve the required weld metal tensile properties for a range of potential slurry pipeline grades, including X52, X60, X65, X70, and X80. The ER-HMS weld metal demonstrates markedly higher toughness measurements than is required for slurry pipe applications.

TABLE 4

Tested ER-HMS weld metal properties compared to girth weld property requirements for a typical API X70 grade based slurry pipeline design.

| Test Type | Property | Requirement | ER-HMS Weld Result |
|---|---|---|---|
| Tensile | Yield Strength | >70 ksi | 80.3 ksi |
| | Ultimate Tensile Strength | >82.7 ksi | 131.7 ksi |
| | Tensile Elongation | >16% | 51.5% |
| CVN | CVN WCL (@ −29° C.) | >27 J | Av: 66.4 J |
| | CVN FL (@ −29° C.) | >27 J | Av: 71.9 J |
| | CVN FL + 2 mm (@ −29° C.) | >27 J | Av: 71.3 J |
| | CVN FL + 5 mm (@ −29° C.) | >27 J | Av: 90.4 J |
| | CVN WCL (@ −46° C.) | >27 J | Av: 70.1 J |
| | CVN FL (@ −46° C.) | >27 J | Av: 65.5 J |
| | CVN FL + 2 mm (@ −46° C.) | >27 J | Av: 49.8 J |
| | CVN FL + 5 mm (@ −46° C.) | >27 J | Av: 70.5 J |

Figure 9:
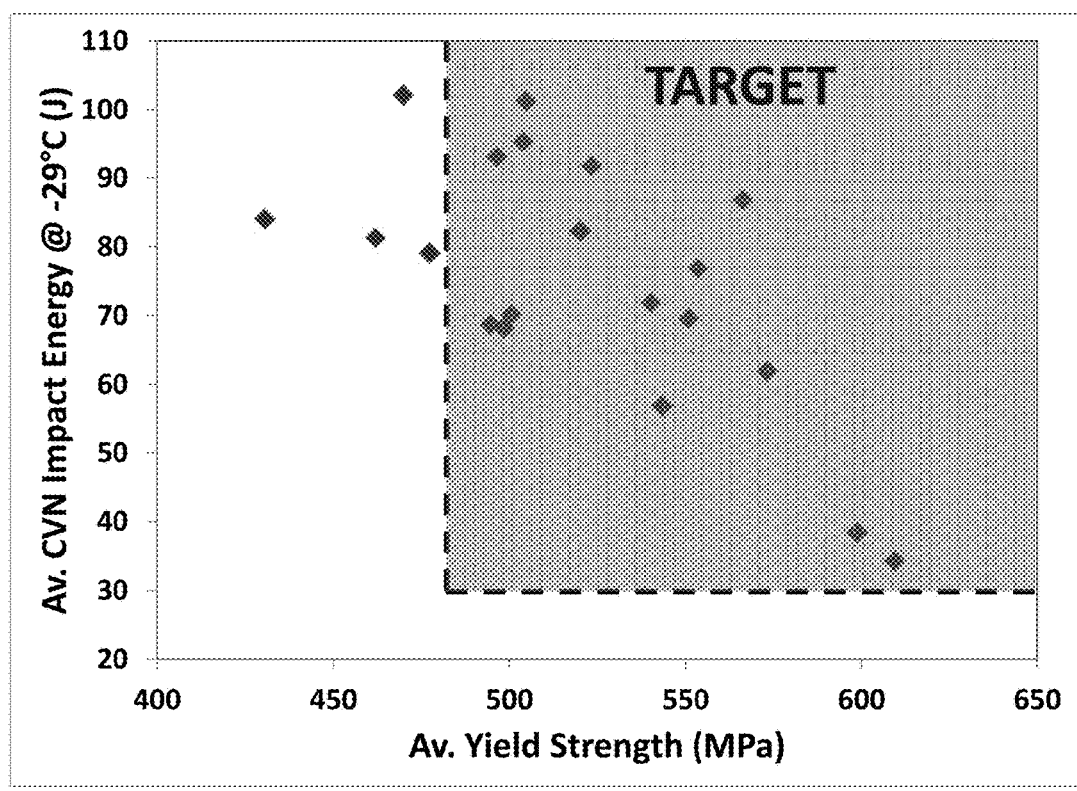
FIG. 9 is a plot that illustrates the average yield strength and average conducting Charpy V-notch (CVN) values for candidate HMS girth welding consumable.

The ER-HMS weld metal must achieve minimum toughness properties required for the application (slurry pipe). The base metal near the weld (the HAZ) of the present disclosure can also achieve these minimum toughness properties. The most common assessment of toughness for this application is impact toughness measured by conducting Charpy V-notch (CVN) tests of the weld metal and several regions of the HAZ. The test values, reported in units of energy (i.e., joules, J), must be greater than the minimum required CVN as specified by the design code for the application. The ER-HMS welds achieve the requirements in both the weld metal and the erosion resistant HMS base metal HAZ. The weld metal toughness is achieved with a weld metal microstructure consisting of austenite phase and a limited amount of carbides, which results in a ductile fracture mode. The base metal HAZ toughness can be achieved by controlling welding heat input such that carbide precipitation in the HAZ is minimized. High heat inputs can lead to excessive carbide precipitation at HAZ grain boundaries and increased hardness in the HAZ, leading to inadequate CVN toughness values. An example of the CVN values achieved with produced ER-HMS welds is shown in Table 4 and compared to weld impact toughness requirements for slurry pipe application. FIG. 9 is a plot that illustrates the average yield strength and average CVN values for candidate HMS girth welding consumable as performed under the conditions described above and with the compositions as shown in Table 3. The target ranges of a minimum yield strength of 485 ksi and minimum CVN energy of 27 J are shown within the shaded region labeled target. Welds FX-5, FX-8, FX-14, and FX-16 met the target ranges, while welds FX-1, FX-9, FX-11, FX-17 did not meet the target ranges.

Figure 10:
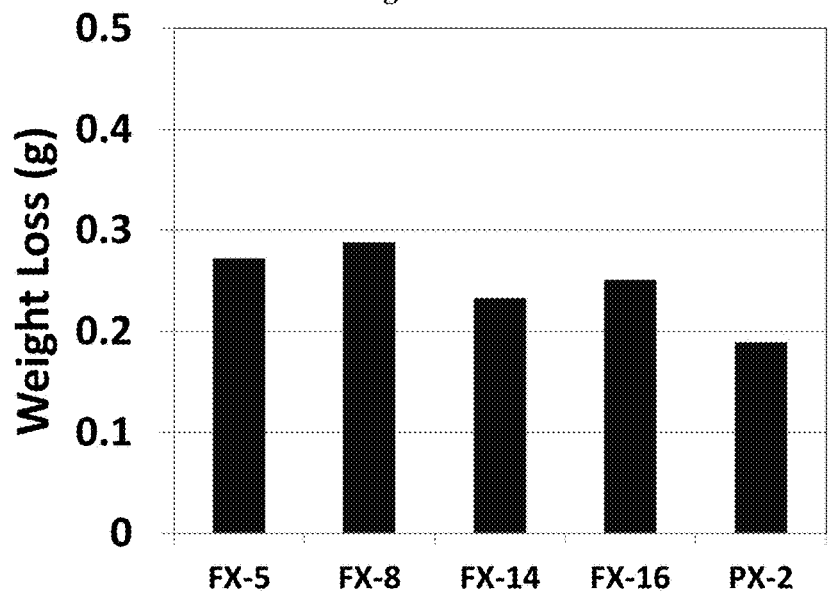
FIG. 10 shows jet impingement erosion test results for candidate ER-HMS weld metals.

The ER-HMS weld metal of the present disclosure achieves similar erosion/corrosion resistance compared to the erosion resistant HMS pipe body. As a result, the ER-HMS is a viable option to join HMS slurry pipe sections. The inner wall of the pipe and thus the root surface of the girth weld are exposed to the erosive/corrosive operating slurry environment. The weld metal must have similar resistance to erosion/corrosion degradation as the base metal in order to achieve the maximum operating benefits of improved erosion/corrosion performance in the HMS base metal. Faster degradation rates in the welds would lead to replacement of the slurry pipe prior to full utilization of the available lifetime in the base metal pipe. There do not exist established, standardized tests or minimum property requirements for erosion/corrosion degradation in slurry pipe environments. It is particularly challenging to assess the combined synergistic effects of erosion and corrosion in small-scale lab tests. As such, assessment of erosion/corrosion performance is conducted by conducting separate erosion and corrosion tests and conducting field tests to expose the ER-HMS weld metal to the actual field conditions. The preferred test for erosion performance is the jet impingement test, which involves directing a high velocity water and sand mixture at the sample surface for a prescribed rate and duration and measuring the amount of material that is lost. The jet impingement test is seen as providing a general indication of relative erosion resistance. It is limited in that the sizes and distributions of the sand particles in the test are quite different than the sizes and distributions of the solids in slurry pipe service. Examples of jet impingement results for ER-HMS weld metals are shown in FIG. 10. Lab scale corrosion testing can be conducted on weld material to assess the corrosion performance of the ER-HMS weld metal as compared to the HMS base metal. Coupons from test welds can be extracted to contain both weld metal and base metal. This allows for an assessment of any potential preferential weld corrosion, which can result from significant electrochemical potential differences between a weld metal and a base metal. The coupons can be exposed to an aqueous environment that simulates a specific slurry pipeline corrosive environment, typically containing chlorides and dissolved oxygen. Coupons can be exposed for a 30 day test duration, after which they are removed from the environment and analyzed to assess performance. The overall weight loss of the coupons can be used to determine a general corrosion rate, and the post-test surface profile can be measured to determine depths of corrosion penetration in both the weld metal region and the base metal region. Corrosion coupon testing of ER-HMS test welds in a representative aqueous slurry pipeline environment resulted in weight loss corrosion rates between 20 and 25 mils per year (mpy) and similar average depths of penetration in both the weld metal and base metal. The levels of erosion and corrosion resistance exhibited by the ER-HMS weld metal are sufficient for joining erosion resistance HMS pipe for the slurry pipeline application.

Weldability:

The novel ER-HMS weld metal can provide the required weldability to join erosion resistant HMS slurry pipe through girth butt welding. This weldability is achieved through proper control of weld metal chemistry, welding process parameters, and/or welding joint design.

Figure 11:
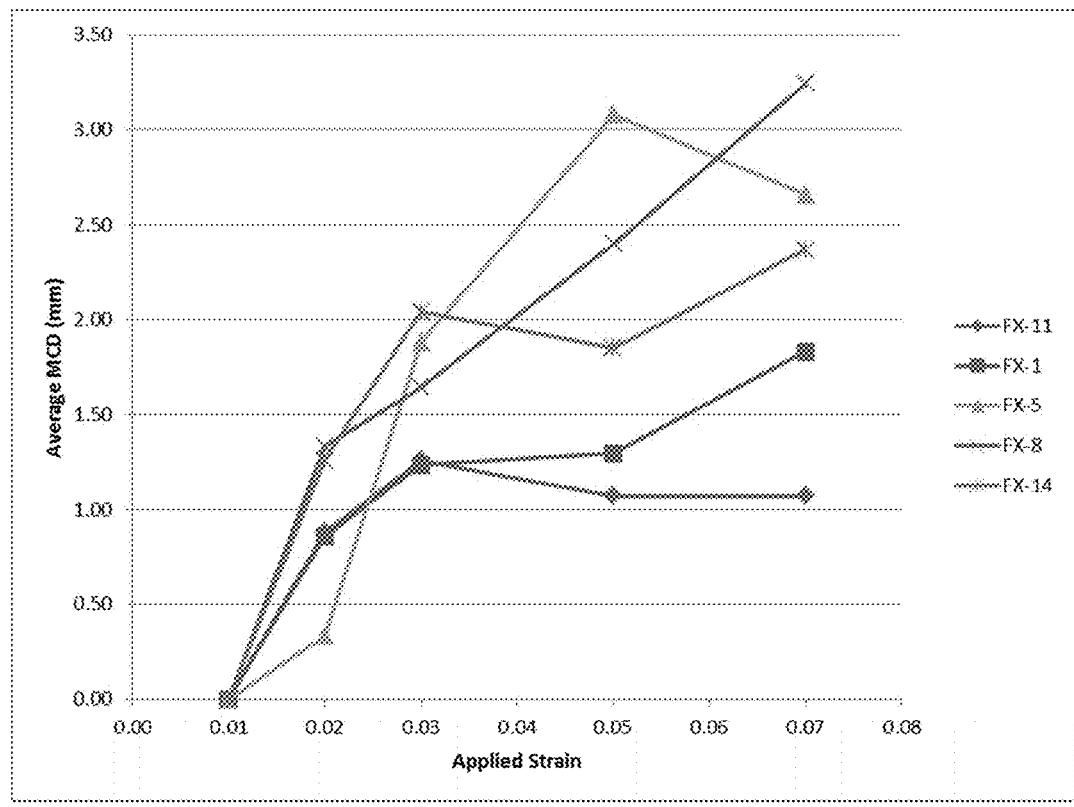
FIG. 11 illustrates the average maximum crack distance (MCD) (mm) values at 1% strain to 7% strain for several ER-HMS consumable in accordance with the present disclosure.

Solidification cracking susceptibility can be assessed using the trans-varestraint test. This test assesses solidification cracking susceptibility for weld metal by applying strain to solidifying weld metal to determine strain-cracking relationships. A key output of the trans-varestraint test is the solidification cracking temperature range (SCTR). A larger SCTR value typically represents a higher susceptibility to solidification cracking. The SCTR values at 5% strain and 7% strain are shown for several ER-HMS consumables in Table 5. The Gas Tungsten Arc Welding (GTAW) was performed under the following conditions: an arc voltage of 11.6 V, an arc current of 180 A, a travel speed of 2.54 mm/second, a heat input of 1.37 kJ/mm, and a cooling rate in solification range of approximately 125° C./second. The calculated SCTR values range from about 40° C. to about 160° C. These values are similar to reported values for stainless steels that solidify as primary austenite (*Welding Metallurgy and Weldability*, Lippold, John C., 2014). This indicates that ER-HMS weld metals can be produced without solidification cracking. In an embodiment, the weld metal has a SCTR value in a range of about 40° C. to about 160° C. FIG. 11 illustrates the average maximum crack distance (MCD) (mm) values at 1% strain to 7% strain for several ER-HMS consumable.

TABLE 5

Trans-varestraint test results for several ER-HMS consumables

| Consumable # | Calculated STR | SCTR (° C.) at 5% strain | SCTR (° C.) at 7% strain |
|---|---|---|---|
| FX-1 | 93.3 | 64 | 90 |
| FX-5 | 123.9 | 152 | 131 |
| FX-8 | 128.6 | 118 | 159 |
| FX-11 | 92.5 | 53 | 53 |
| FX-14 | 144.7 | 94 | 117 |
| FX-16 | 148.5 | 84 | 125 |
| FX-17 | 90.5 | 44 | 43 |
| FX-20 | 108.4 | 87 | 103 |

Figure 12:
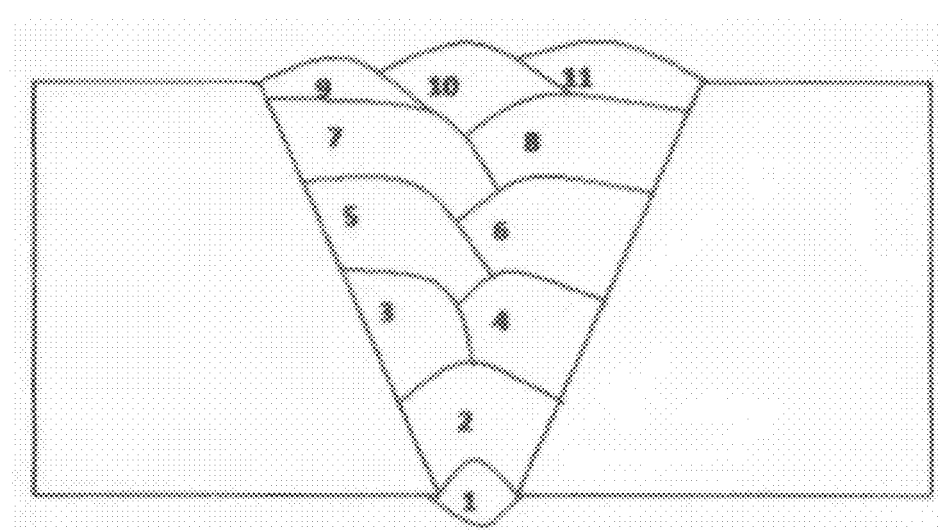
FIG. 12 shows an example of a weld bead sequence of ER-HMS consumable in accordance with an embodiment of the present disclosure.
Figure 13:
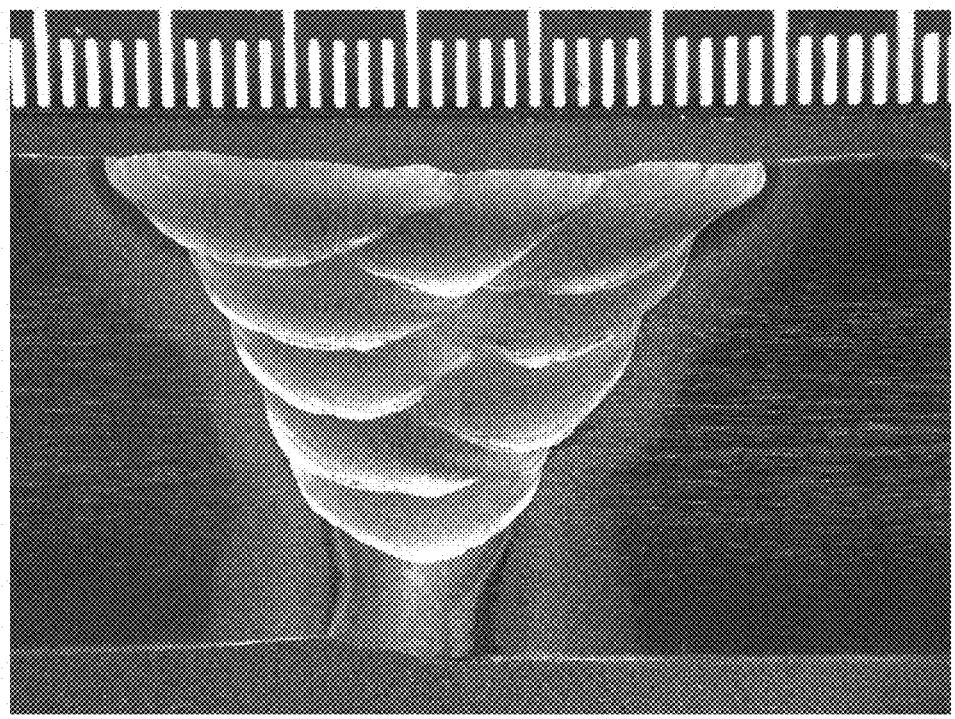
FIG. 13 shows an example of a weld macro for an ER-HMS pipe girth weld in accordance with an embodiment of the present disclosure.
Figure 14:
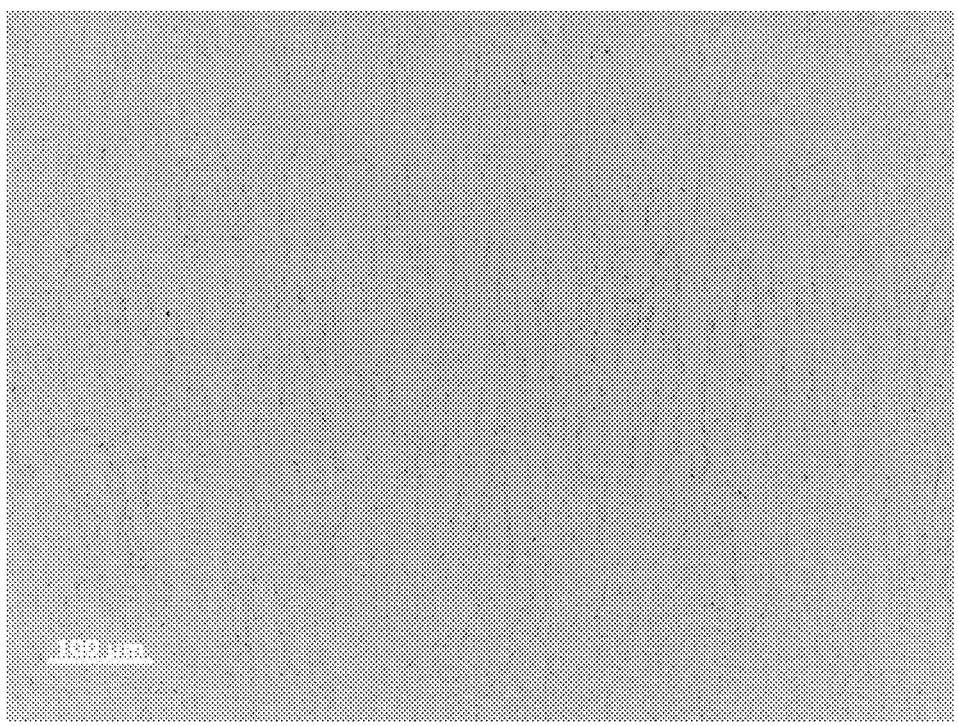
FIG. 14 shows an example of an optical micrograph of an ER-HMS weld metal (pipe girth weld) in accordance with an embodiment of the disclosure.

Welding Process Parameters:

FIG. 12 illustrates an exemplary weld bead sequence for the ER-HMS weld according to an embodiment with an open bevel, as shown in FIG. 2A. An example of a ER-HMS weld macro produced in this embodiment is shown in FIG. 13, and an example of an optical micrograph of the ER-HMS weld metal is shown in FIG. 14. Table 6 is a summary of ASME Section IX test results from 1G pipe girth weld applied as described with regard to FIGS. 2A and 10-12. Mechanized MCAW was performed under the following conditions: 80 Ar/20 $CO_2$ shielding gas as a flow rate of 50 cfh, arc voltage of 20-22 V for roots and 24-31 V for fills, an arc current of 150-165 A for roots and 210-265 A for fills, a filler wire having a diameter of 1.2 mm, a wire feed of 230 ipm for the root and 296-441 ipm for fills, and heat input of 0.9-1.02 kJ/mm for roots and 0.6-0.93 kJ/mm for fills.

TABLE 6

Summary of ASME Section IX test results from ER-HMS weld produced during welding procedure qualification

| PQR Tests | |
|---|---|
| Cross-Weld Tensile | Av YS: 75.39 ksi |
| | Av UTS: 132.4 ksi |
| Side Bend | 3 out of 4 acceptable (root issue on one) |
| CVN WCL (@ −29° C.) | Av: 66.4 J |
| CVN FL (@ −29° C.) | Av: 71.9 J |
| CVN FL + 2 mm (@ −29° C.) | Av: 71.3 J |
| CVN FL + 5 mm (@ −29° C.) | Av: 90.4 J |

The embodiment described above can produce ER-HMS welds that satisfy the requirements for fabricating and applying erosion resistant HMS slurry pipelines. The welds produced during welding procedure qualification were tested. The ER-HMS weld metal properties from these welds are shown in Table 7 and compared to ASME Section IX girth weld requirements for API X70 grade based pipeline design (SMYS is 70 ksi). Mechanized MCAW was performed under the following conditions: 80 Ar/20 $CO_2$ shielding gas as a flow rate of 50 cfh, arc voltage of 20-22 V for roots and 24-31 V for fills, an arc current of 150-165 A for roots and 210-265 A for fills, a filler wire having a diameter of 1.2 mm, a wire feed of 230 ipm for the root and 296-441 ipm for fills, and heat input of 0.9-1.02 kJ/mm for roots and 0.6-0.93 kJ/mm for fills. The produced ER-HMS welds demonstrated superior toughness performance relative to the requirements.

TABLE 7

Summary of ASME Section IX test results from ER-HMS weld produced during welding procedure qualification

| PQR (procedure qualification record) Tests | Requirement | ER-HMS Procedure Qualification Weld Result |
|---|---|---|
| Cross-Weld Tensile | >82.7 ksi | Av UTS: 135.2 ksi |
| Side Bend | No open discontinuity greater than 3 mm | 4 out of 4 acceptable |
| CVN WCL (@ −45° C.) | >27 J | Av: 70.1 J |
| CVN FL (@ −45° C.) | >27 J | Av: 65.5 J |
| CVN FL + 2 mm (@ −45° C.) | >27 J | Av: 49.8 J |
| CVN FL + 5 mm (@ −45° C.) | >27 J | Av: 70.5 J |

Figure 15:
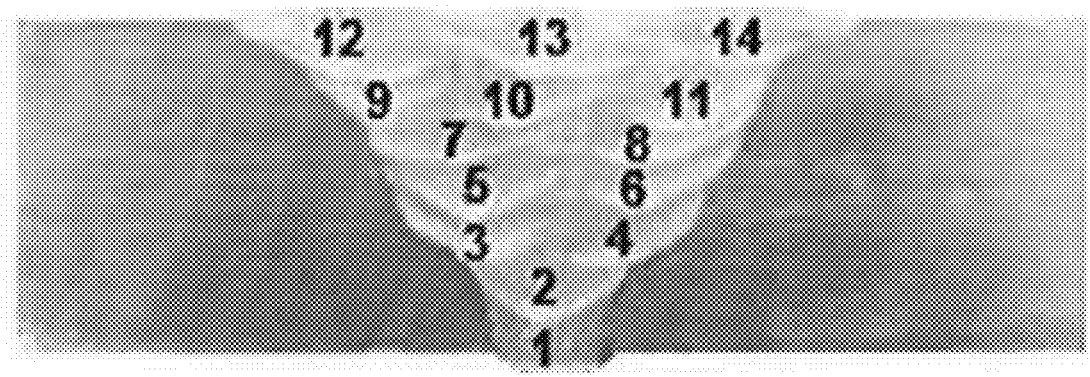
FIG. 15 is a weld bead sequence for physical welding assessments of ER-HMS consumables in accordance with an embodiment of the present disclosure.

FIG. 15 is an example of a weld bead sequence for pipe girth welds (for example, 1G pipe) for a bevel, as shown in FIG. 2B. FIG. 16 illustrates the locations of points within Table 8, which underwent Vickers hardness test. Mechanized MCAW was performed under the following conditions: 80 Ar/20 $CO_2$ shielding gas as a flow rate of 50 cfh, arc voltage of 20-22 V for roots and 24-31 V for fills, an arc current of 150-165 A for roots and 210-265 A for fills, a filler wire having a diameter of 1.2 mm, a wire feed of 230 ipm for the root and 296-441 ipm for fills, and heat input of 0.9-1.02 kJ/mm for roots and 0.6-0.93 kJ/mm for fills. Vickers hardness test provides a wide hardness scale that is easily performed. Vickers Pyramid Number (HV) is the measure of hardness of the Vickers hardness test and is determined by the load over the surface area of the indentation. Table 8 summarizes the Vickers hardness test results for points from a FX-5 1G pipe girth weld.

TABLE 8

Summary of Vickers hardness test results from a FX-5 1G pipe girth weld.

| Base Metal | | HAZ | | Weld Metal | | HAZ | | Base Metal | |
|---|---|---|---|---|---|---|---|---|---|
| Point | HV | Point | HV | Point | HV | Point | HV | Point | HV |
| 1 | 291 | 3 | 280 | 8 | 282 | 13 | 272 | 18 | 289 |
| 2 | 272 | 4 | 271 | 9 | 258 | 14 | 275 | 19 | 275 |
| | | 5 | 285 | 10 | 272 | 15 | 289 | | |
| | | 6 | 284 | 11 | 304 | 16 | 287 | | |
| | | 7 | 294 | 12 | 291 | 17 | 288 | | |
| Average | 282 | Average | 283 | Average | 281 | Average | 282 | Average | 282 |
| Maximum Hardness Value (HV): | | | | 304 | | | | | |

As would be understood by those of skill in the art, certain quantities, amounts, and measurements are subject to theoretical and/or practical limitations in precision, which are inherent to some of the instruments and/or methods. Therefore, unless otherwise indicated, it is contemplated that claimed amounts encompass a reasonable amount of variation.

It is understood that the detailed examples and embodiments described herein are given by way of example for illustrative purposes only, and are in no way considered to be limiting to the disclosure. Various modifications or changes in light thereof will be suggested to persons skilled in the art and are included within the spirit and purview of this application and are considered within the scope of the appended claims. For example, the relative quantities of the ingredients may be varied to optimize the desired effects, additional ingredients may be added, and/or similar ingredients may be substituted for one or more of the ingredients described. Additional advantageous features and functionalities associated with the systems, methods, and processes of the present disclosure will be apparent from the appended claims.

The invention claimed is:

1. A system for providing erosion/corrosion resistant high manganese welds, the system comprising:
   a consumable wire electrode for producing a weldment and comprising carbon in a range of about 0.4 wt % to about 0.8 wt %, manganese in a range of about 18 wt % to about 24 wt %, chromium in an amount of about ≤6 wt %, molybdenum in an amount of about ≤4 wt %, nickel in an amount of about ≤5 wt %, silicon in a range of about 0.4 wt % to about 1.0 wt %, sulfur in an amount of about ≤200 ppm, phosphorus in an amount of about ≤200 ppm, and a balance comprising iron; and
   a pulsed gas metal arc welding power source that perform gas metal arc welding, wherein the pulsed gas metal arc welding power source produces a welding heat input no more than about 2.5 kJ/mm, has a background current of about 75 amps to about 150 amps, and has pulse current magnitudes from about 350 amps to about 450 amps.

2. The system of claim 1, wherein the welding heat input is in a range of about 0.6 to about 1.0 kJ/mm.

3. The system of claim 1, further comprising an apparatus for providing at least one shielding gas.

4. The system of claim 3, wherein the at least one shielding gas includes $CO_2$ in a range of about 10% to 30%.

5. The system of claim 3, wherein the at least one shielding gas comprises about 80% Argon and about 20% $CO_2$.

6. The system of claim 1, wherein the consumable wire electrode further comprises titanium in an amount of about ≤2 wt %.

7. The system of claim 1, wherein the consumable wire electrode further comprises niobium in an amount of about ≤5 wt %.

8. The system of claim 1, wherein the consumable wire electrode a microstructure comprising austenite grains.

9. The system of claim 1, wherein the consumable wire electrode comprises carbon in the range of about 0.5 wt % to about 0.7 wt %, manganese in the range of about 19 wt % to about 23 wt %, chromium in a range of about 1 wt % to about 4 wt %, molybdenum in a range of about 1 wt % to about 3 wt %, nickel in a range of about 1 wt % to about 4 wt %, silicon in the range of about 0.4 wt % to about 0.6 wt %, sulfur in the amount of about ≤200 ppm, phosphorus in the amount of about ≤200 ppm, and the balance comprising iron.

10. The system of claim 1, wherein the consumable wire electrode further comprises titanium in an amount of about 1 wt % to about 2 wt %.

* * * * *